US012646142B1

(12) United States Patent
Viswanathan et al.

(10) Patent No.: US 12,646,142 B1
(45) Date of Patent: Jun. 2, 2026

(54) IMAGE UPSAMPLING SYSTEM FOR REMOTE SENSING DATA

(71) Applicant: Amazon Technologies, Inc., Seattle, WA (US)

(72) Inventors: Anirudh Viswanathan, Santa Clara, CA (US); Xiong Zhou, Bothell, WA (US); Amit Modi, Daly City, CA (US); Kris R Efland, Lafayette, CA (US); Weifeng Chen, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 406 days.

(21) Appl. No.: 18/199,658

(22) Filed: May 19, 2023

(51) Int. Cl.
*G06T 3/4038* (2024.01)
*G06T 5/50* (2006.01)

(52) U.S. Cl.
CPC .............. *G06T 3/4038* (2013.01); *G06T 5/50* (2013.01); *G06T 2207/10032* (2013.01); *G06T 2207/20212* (2013.01); *G06T 2207/30252* (2013.01)

(58) Field of Classification Search
CPC . G06T 2207/10032; G06T 2207/20212; G06T 2207/20081
See application file for complete search history.

(56) References Cited

U.S. PATENT DOCUMENTS

2024/0013554 A1* 1/2024 Keski-Valkama ........ G06T 7/33
2024/0211540 A1* 6/2024 Olsen .................... G06T 3/4046

OTHER PUBLICATIONS

T. Sun, Z. Di, P. Che, C. Liu and Y. Wang, "Leveraging Crowdsourced GPS Data for Road Extraction From Aerial Imagery," 2019 IEEE/CVF Conference on Computer Vision and Pattern Recognition (CVPR), Long Beach, CA, USA, 2019, pp. 7501-7510. (Year: 2019).*
S. Hadi, S. Phon-Amnuaisuk and S. -J. Tan, "Semantic Instance Segmentation in a 3D Traffic Scene Reconstruction task," 2020 59th Annual Conference of the Society of Instrument and Control Engineers of Japan (SICE), Chiang Mai, Thailand, 2020, pp. 186-191. (Year: 2020).*
M. Dziubiński, From semantic segmentation to semantic bird's-eye view in the CARLA simulator, Medium, May 14, 2019. Accessed on Feb. 3, 2020. (Year: 2020).*

* cited by examiner

*Primary Examiner* — Emily C Terrell
*Assistant Examiner* — Jacqueline R Zak
(74) *Attorney, Agent, or Firm* — Hogan Lovells US LLP

(57) ABSTRACT

Systems and techniques are disclosed for upsampling low resolution images in remote sensing data, such as satellite images, into higher-resolution upsampled images. A machine learning upsampling model is trained on a training data set containing crowdsourced high resolution images, such as dashcam images, cell phone camera images, and other types of images of geographical areas, as well as corresponding low resolution images from remote sensing data that depict the same geographical areas. The upsampling model is trained on the training data set to determine an upsampling approach that converts the low resolution images into upsampled images that match the crowdsourced high resolution images of the same geographical areas. Following training of the upsampling model, the upsampling model is used to upsample new low resolution images in remote sensing data into higher-resolution upsampled images.

20 Claims, 9 Drawing Sheets

400 ⌐

500

OBTAIN LOW RESOLUTION IMAGE IN REMOTE
SENSED DATA
502

GENERATE HIGHER-RESOLUTION UPSAMPLED
IMAGE BY APPLYING UPSAMPLING MODEL TO
LOW RESOLUTION IMAGE
504

OUTPUT HIGHER-RESOLUTION
UPSAMPLED IMAGE
506

600 →

SERVICE PROVIDER NETWORK <u>602</u>

STORAGE SERVICE
<u>800A</u>

ON-DEMAND COMPUTING SERVICE
<u>800B</u>

SERVERLESS COMPUTE SERVICE
<u>800C</u>

CRYPTOGRAPHY SERVICE
<u>800D</u>

AUTHENTICATION SERVICE
<u>800E</u>

POLICY MANAGEMENT SERVICE
<u>800F</u>

DEPLOYMENT SERVICE
<u>800G</u>

IMAGE UPSAMPLING SYSTEM FOR REMOTE SENSING DATA

BACKGROUND

Remote sensing data can include images of geographical areas. For example, remote sensing data can include images of geographical areas that are captured by cameras on satellites that pass over those geographical areas. As another example, remote sensing data can include images of geographical areas captured by cameras on unmanned aerial vehicles (UAVs), such as autonomous and/or remotely-controlled drones, and/or other aerial vehicles that fly over the geographical areas.

Consumers of remote sensing data may use the remote sensing data for many purposes. For example, an agricultural company may use remote sensing data that depicts a field of crops to monitor the state of the crops and/or to determine when the crops are ready to be harvested. As other examples, consumers may use remote sensing data to monitor traffic patterns in a geographical area, track progress of construction sites over time, track deforestation in a geographical area, and/or for other purposes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
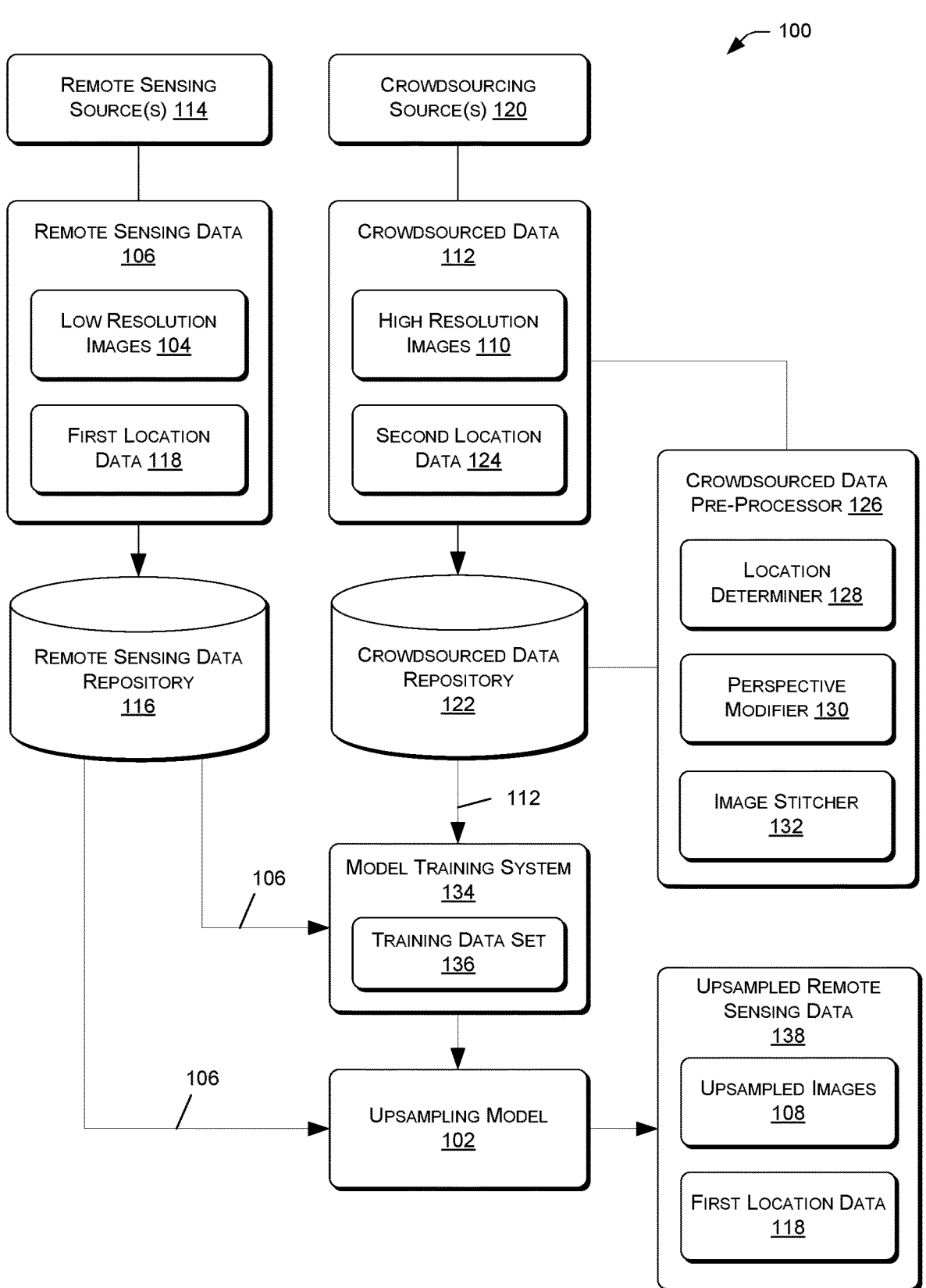
FIG. 1 shows an example of an image upsampling system that uses an upsampling model to convert low resolution images, in remote sensing data associated with geographical areas, into upsampled images that have a higher resolution than the low resolution images.

Remote sensing data can include images of geographical areas captured by cameras on satellites, UAVs, or other aerial vehicles or equipment that fly or otherwise pass over the geographical areas. Consumers of remote sensing data may use the remote sensing data for many purposes. As an example, a consumer may use a satellite image of a geographical area to count items that are present in the geographical area or to determine the state of one or more elements depicted in the satellite image. As another example, a consumer may compare different satellite images of a geographical area taken over a period of time to identify and/or monitor changes within the geographical area over the period of time.

However, images in remote sensing data may have image resolutions that are too low to depict details of geographical areas that consumers may be interested in viewing. For example, although a satellite image may depict a geographical region, an individual pixel of that satellite image may correspond to an area within the geographical region that is still relatively large. For example, an individual pixel of a satellite image may correspond to a geographical area that is between one hundred square meters and fifty square centimeters, or any other size. Accordingly, the resolution of a satellite image or other type of remotely-sensed image may be too low to depict details such as road markings, road cracks, individual plants, individual vehicles, and/or other relatively small elements that may be present within a geographical area depicted in the remotely-sensed image.

Consumers may contact a provider of remote sensing data to request that satellites or other remote sensing equipment be deployed or tasked to capture higher resolution images of a particular geographical area. For instance, although a satellite image provider may task satellites to routinely capture low-resolution images of geographical areas one or more times per day, the satellite image provider may be able to specially task the same or different satellites to pass over a particular geographical area identified by a consumer to capture higher-resolution images of that particular geographical area. However, tasking satellites to capture high resolution images of a particular geographical area can be expensive, and/or may prevent the satellites from capturing images of other geographical areas.

Similarly, satellite providers may task satellites to capture high resolution images of geographical areas on a relatively infrequent schedule, such as once a day, once a week, or once a month, but task the same or different satellites to capture low resolution images of the same geographical areas on a more frequent basis, such as multiple times per day. If the frequency at which the high resolution images of a geographical area captured by the satellites is too infrequent for a consumer, the consumer may request that the satellites be tasked to capture high resolution images more frequently. However, re-tasking satellites to capture high resolution images of a particular geographical area on a more frequent basis can also be expensive and/or prevent the satellites from capturing images of other geographical areas.

However, described herein is an image upsampling system that, using a machine learning upsampling model, can upsample low resolution images in remote sensing data into higher-resolution upsampled images. The upsampling model can be trained on a training data set that pairs low resolution images of geographical areas in remote sensing data with corresponding high resolution images of the same geographical areas from crowdsourced data. The crowdsourced high resolution images can be dashcam images, cell phone images, and/or other images that depict geographical areas at higher levels of detail than remotely-sensed low resolution images of the same geographical areas. The upsampling model can be trained to determine an upsampling approach that converts the low resolution images in the training data set into upsampled images that match the crowdsourced high resolution images in the training data set. After the upsampling model is trained, the upsampling model can use the upsampling approach to upsample low resolution images in new remote sensing data into higher-resolution upsampled images. Accordingly, consumers can access the upsampled images of geographical areas instead of, or in addition to, the original low resolution images from the remote sensing data. The consumers can use details in the higher-resolution upsampled images generated by the image upsampling system described herein to monitor geographical areas, instead of requesting that remote sensing sources re-task satellites or otherwise adjust operations to capture higher resolution images of those geographical areas.

The systems and methods associated with the image upsampling system described herein may be implemented in a number of ways. Example implementations are provided below with reference to the following figures.

FIG. 1 shows an example of an image upsampling system 100 that uses an upsampling model 102 to convert low resolution images 104, in remote sensing data 106 associated with geographical areas, into upsampled images 108. The resolution of the upsampled images 108 can be higher than the resolution of the low resolution images 104 of the geographical areas, such that the upsampled images 108 can depict the same geographical areas at a higher level of detail. The upsampling model 102 can be a machine learning model that is trained, based on high resolution images 110 of geographical areas in crowdsourced data 112 that correspond to low resolution images 104 of the same geographical areas, to upsample low resolution images 104 in the remote sensing data 106 into higher-resolution upsampled images 108.

The image upsampling system 100 can receive remote sensing data 106 from one or more remote sensing sources 114. The remote sensing sources 114 can be systems associated with satellites, unmanned aerial vehicles (UAVs) such as autonomous and/or remotely-controlled drones, aerial vehicles such as airplanes and helicopters, and/or other types of vehicles or equipment that may fly or pass over geographical areas to capture remote sensing data 106 associated with the geographical areas. The remote sensing sources 114 can have cameras, sensors, and/or other remote sensing equipment configured to capture remote sensing data 106, including low resolution images 104, associated with geographical areas when the remote sensing sources 114 are above the geographical areas. For example, the remote sensing sources 114 can include satellites that pass over geographical areas and use cameras to capture low resolution images 104 of the geographical areas from above.

The remote sensing sources 114 can provide remote sensing data 106, including the low resolution images 104, to the image upsampling system 100. Such remote sensing sources 114 can provide the low resolution images 104 to the image upsampling system 100 through one or more networks, application programming interfaces (APIs), and/or other data submission systems. The image upsampling system 100 may store the received remote sensing data 106 in a remote sensing data repository 116, such as a database or other data storage system.

The remote sensing data 106 provided by the remote sensing sources 114 and/or stored in the remote sensing data repository 116 can include first location data 118 corresponding with the low resolution images 104. The first location data 118 can indicate locations of the geographical areas depicted by the low resolution images 104. For example, the first location data 118 can indicate latitude and longitude coordinates, such as Global Positioning System (GPS), and/or other types of geographical or spatial coordinates that indicate locations of the geographical areas depicted by the low resolution images 104. As an example, individual low resolution images 104 can be tagged with, or otherwise be associated with, corresponding GPS coordinates or other types of first location data 118 indicating locations of geographical areas depicted by the low resolution images 104.

The low resolution images 104 can have a lower resolution than the high resolution images 110 provided in the crowdsourced data 112, and a lower resolution than the upsampled images 108 that can be produced by the upsampling model 102. For example, the low resolution images 104 may have a relatively low resolution in which a single pixel corresponds with a relatively large geographical area, such as an area that is between one hundred square meters and fifty square centimeters, or any other size. Accordingly, the pixels of the low resolution images 104 may be unable to depict elements that are smaller than sizes that correspond to the pixels. As an example, if the pixels of a low resolution image each correspond to a different one hundred square meter area, the pixel resolution of the low resolution image may be too low to depict road markings, road cracks, individual plants, individual vehicles, and/or other relatively small elements that may be present within a geographical area depicted in the low resolution image.

However, such relatively small elements within a geographical area can be depicted within high resolution images 110 provided in crowdsourced data 112. As described further below, the high resolution images 110 that may depict smaller details than the low resolution images 104 can be used to train the upsampling model 102, such that the upsampling model 102 can be used to upsample low resolution images 104 into higher-resolution upsampled images 108 that depict smaller details than the low resolution images 104.

The image upsampling system 100 can receive crowdsourced data 112, including high resolution images 110, associated with geographical areas from one or more crowdsourcing sources 120. The image upsampling system 100 may store the received crowdsourced data 112 in a crowdsourced data repository 122, such as a database or other data storage system. In some examples, the crowdsourced data repository 122 can be separate from the remote sensing data repository 116. In other examples, the remote sensing data repository 116 and the crowdsourced data repository 122 can be combined into the same data repository.

The crowdsourcing sources 120 can be public and/or private sources, such as systems, groups, individuals, and/or other entities that obtain and/or collect crowdsourced data 112, including high resolution images 110, associated with geographical areas. Such crowdsourcing sources 120 can provide the crowdsourced data 112 to the image upsampling system 100 through one or more networks, APIs, and/or other data submission systems.

As an example, the crowdsourcing sources 120 can include one or more sources that collect high resolution images 110 captured by dashcams and/or other types of vehicle-mounted cameras as corresponding vehicles travel around geographical areas. For example, a crowdsourcing source may be associated with a fleet of delivery vehicles, and that provides the image upsampling system 100 with high resolution images 110 captured by dashcams mounted on individual delivery vehicles. Other crowdsourcing sources may be associated with dashcams of ride-sharing vehicles or other fleets of vehicles, personal dashcams of users who have agreed to provide corresponding dashcam images to the image upsampling system 100, cameras of street-mapping vehicles that capture images of environments surrounding the street-mapping vehicles, and/or other types of cameras and/or vehicles.

As another example, the crowdsourcing sources 120 can be associated with cell phone cameras and/or other types of cameras that capture images of geographical areas. For example, crowdsourcing sources 120 can include users who have agreed to provide cell phone images and/or other personally-captured images of geographical areas to the image upsampling system 100.

As yet another example, the crowdsourcing sources 120 can be associated with UAVs, other aerial vehicles, and/or other equipment that can capture the high resolution images 110 of geographical areas at higher resolutions than the low resolution images 104 captured by similar or different remote sensing sources 114. For example, if the remote sensing sources 114 are satellites, the crowdsourcing sources 120 may include drones that capture images of geographical areas closer to the ground than the satellites, such that the droned-captured high resolution images 110 may depict a geographical area in more detail than satellite-captured low resolution images 104 of the same geographical area.

In some examples, crowdsourcing sources 120 can provide crowdsourced data 112 to the image upsampling system 100 directly and/or exclusively. As an example, crowdsourcing sources 120 can agree to transmit crowdsourced data 112 to the image upsampling system 100 directly when the crowdsourced data 112 is captured, and/or provide the crowdsourced data 112 to the image upsampling system 100 exclusively.

In other examples, a crowdsourcing source can provide crowdsourced data 112 to the public and/or other consumers for free or for a fee, and an operator of the image upsampling system 100 can accordingly obtain the crowdsourced data 112 from the crowdsourcing source. As an example, a website may provide the public with access to a set of street-mapping images of geographical areas to the public, and the image upsampling system 100 can obtain the publicly-available set of street-mapping images from the website. As another example, a web crawler associated with the image upsampling system 100 can traverse the Internet and search for high resolution images 110 of geographical areas that have been posted online, and provide such high resolution images 110 to the image upsampling system 100 as crowdsourced data 112.

The high resolution images 110 can depict geographical areas in a higher resolution, and with more detail, than corresponding low resolution images 104. In some examples, the high resolution images 110 may be more detailed than the low resolution images 104 at least in part because the high resolution images 110 are captured from positions that are lower to the ground than positions at which the remote sensing sources 114 capture the low resolution images 104. For example, while the low resolution images

104 may be captured by satellites or other aerial remote sensing sources 114 high above the ground of a geographical area, high resolution images 110 can be captured by dashcams, cell phone cameras, and/or other cameras that are relatively close to the ground of the geographical area.

Such high resolution images 110 may accordingly be more likely to depict road markings, road cracks, individual plants, individual vehicles, and/or other relatively small elements than the low resolution images 104. The high resolution images 110 may also depict elements shown in the low resolution images 104 at a higher level of detail. The high resolution images 110 may therefore the same geographical areas at a higher resolution and with more detail than the low resolution images 104, and the low resolution images 104 may be compressed relative to the high resolution images 110 by multiple orders of magnitude.

As an example, a satellite-captured low resolution image may have a resolution in which the width of a pixel corresponds with a distance of ten meters. The width of a lane of a road may be 3.7 meters. Because the width of the road lane is less than half of the distance that corresponds to a single pixel of the low resolution image, the low resolution image may use an entire pixel to represent the road lane, or may omit a depiction of the road lane. However, a dashcam may have a 720p resolution, such that each captured video frame is an image with a resolution of 1280 pixels by 720 pixels. Such a 720p dashcam image may use the majority of the pixels across the width of the dashcam image to depict the road lane, and/or use the majority of the pixels towards the bottom portion of the dashcam image to depict the road lane. Accordingly, the dashcam high resolution image can use a significantly higher number of pixels to depict the road lane than the satellite-captured low resolution image that may at most use a width of a single pixel to depict the road lane, and thereby depict the road lane at a significantly greater level of detail. For instance, the dashcam high resolution image may in some cases be between 100 and 1000 times more detailed than the corresponding satellite-captured low resolution image, and the satellite-captured low resolution image may be compressed by two to three orders of magnitude relative to the dashcam high resolution image.

The high resolution images 110 of geographical areas in the crowdsourced data 112 can be associated with second location data 124 indicating the locations of the geographical areas. The second location data 124 can indicate locations of geographical areas depicted by the high resolution images 110 and/or locations at which the high resolution images 110 were captured. Similar to the first location data 118, the second location data 124 can indicate latitude and longitude coordinates, such as GPS coordinates, and/or other types of geographical or spatial coordinates that indicate locations associated with the high resolution images 110.

In some examples, the crowdsourced data 112 provided by the crowdsourcing sources 120 can natively include second location data 124 corresponding with the high resolution images 110. As an example, individual high resolution images 110 generated by dashcams, cell phone cameras, and/or other cameras can be tagged with, or otherwise be associated with, corresponding GPS coordinates or other types of second location data 124 indicating locations where the high resolution images 110 were captured.

In other examples, second location data 124 may be omitted from the crowdsourced data 112 provided by the crowdsourcing sources 120. However, the image upsampling system 100 can have, or be associated with, a crowdsourced data pre-processor 126 that includes a location determiner 128 configured to determine second location data 124 associated with high resolution images 110 in the crowdsourced data 112. Accordingly, if high resolution images 110 in the crowdsourced data 112 are not initially associated with second location data 124, the location determiner 128 can determine locations associated with the high resolution images 110 and add corresponding second location data 124 associated with the high resolution images 110 to the crowdsourced data 112.

For example, if the high resolution images 110 include a set of video frames from a dashcam captured along a route that a vehicle traveled, the location determiner 128 may use visual odometry, image recognition operations, and/or other image processing operations to identify the route traveled by the vehicle and positions along the route at which individual video frames were captures. As an example, the location determiner 128 can use visual odometry techniques to identify differences between dashcam video frames that may indicate when the vehicle was turning or driving straight, use those indications to estimate trajectories of the vehicle over time, and compare the estimated trajectories of the vehicle with streets on a map to find a navigable travel route that corresponds with the estimated trajectories of the vehicle over the period of time.

As another example, if newly-received high resolution images 110 are still images or video frames of an environment, the location determiner 128 may use image processing techniques to identify features shown in the high resolution images 110, such as signs, buildings, trees, and other elements. The location determiner 128 can use such features identified in newly-received high resolution images 110 to find any previously-received high resolution images 110 or other geotagged images that also show those features. Based on location data indicating locations associated with the matching previously-received high resolution images 110 or other geotagged images that also show the features, the location determiner 128 can add corresponding second location data 124 indicating those locations to the newly-received high resolution images 110.

As yet another example, the location determiner 128 may be a machine learning model, such as a machine learning model based on a neural network and/or other types of machine learning frameworks, that has been trained based on images tagged with one or more types of location data to use image features in other images that are not tagged with location data to predict locations depicted in the other image. Such a machine learning model can be re-trained over time based on new and/or updated location data associated with images, such that accuracy of location predictions generated by the location determiner 128 can improve as additional data from new and/or old sources is received and used to re-train the machine learning model. Accordingly, the location determiner 128 can process newly-received high resolution images 110 and predict the second location data 124 associated with the high resolution images 110 based on how the location determiner 128 has been trained and/or re-trained.

As discussed above, the low resolution images 104 in the remote sensing data 106 can be top-down views of geographical areas that have been captured by satellites, drones, or other remote sensing sources 114 that are above those geographical areas. In some examples, high resolution images 110 provided by crowdsourcing sources 120 may also be top-down views of geographical areas. As an example, the low resolution images 104 can be top-down images of geographical areas taken by satellites from high above the geographical areas, while the high resolution images 110 may be higher resolution top-down images taken by drones that are above the geographical areas but that are closer to the ground than the satellites.

However, in other examples, the high resolution images 110 may be front-facing images or other images of geographical areas that have different perspectives of geographical areas than top-down images of the geographical areas. As an example, the low resolution images 104 can be top-down images of geographical areas taken by satellites, drones, and/or other aerial sources from above the geographical areas, while the high resolution images 110 may be dashcam images, cell phone images, and/or other images captured by crowdsourcing sources 120 that are closer to the ground than the satellites, drones, and/or other aerial sources that provide the low resolution images 104.

However, a perspective modifier 130 of the crowdsourced data pre-processor 126 can convert such high resolution images 110 that do not have a top-down perspective into top-down images. For example, if a high resolution image is a video frame captured by a vehicle dashcam that faces forward while the vehicle is driving, the high resolution image can be a front-facing image of the environment in front of the vehicle. However, the perspective modifier 130 can use geometry transform operations, perspective warping operations, perspective transformation operations, image projection operations, matrices, and/or other operations and image processing techniques to convert the front-facing dashcam image into a top-down image of the environment in front of the vehicle. For example, the perspective modifier 130 may use a single column of pixels in a front-facing dashcam image to generate a corresponding section of a top-down image that extends away from a position corresponding to the dashcam. As another example, the perspective modifier 130 can be a machine learning model, such as a machine learning model based on a neural network and/or other types of machine learning frameworks, that has been trained to convert front-facing images into top-down images based on historical pairs of front-facing images and corresponding top-down images. Accordingly, the perspective modifier 130 can use perspective transformation operations, determined during training of the machine learning model, to convert the front-facing dashcam image into a corresponding top-down image. An example of conversions of front-facing images into top-down images is discussed further below with respect to FIG. 2.

The crowdsourced data pre-processor 126 can also have an image stitcher 132 that may combine multiple top-down high resolution images 110 of geographical areas into a high resolution image of a larger geographical area. As an example, if the high resolution images 110 include a set of front-facing dashcam images captured as a vehicle traveled along a road, each front-facing dashcam image can be converted into a corresponding top-down image by the perspective modifier 130 as discussed above. Each top-down image generated by the perspective modifier 130 can correspond with a different location along the road traveled by the vehicle. Accordingly, the image stitcher 132 can combine the top-down images associated with different locations along the road into a larger image swath that depicts a top-down view of the locations along the road traveled by the vehicle. As another example, if multiple high resolution images 110 depict different overlapping areas within a larger geographical area, the image stitcher 132 can line up overlapping portions of the high resolution images 110 that depict the same features, and combine the high resolution images 110 to generate a high resolution image of the larger geographical area. The image stitcher 132 and/or the location determiner 128 can update or add second location data 124 associated with stitched-together high resolution images 110 to indicate locations and/or boundaries of larger geographical areas depicted by the stitched-together high resolution images 110. An example of stitching together an image swath from separate images is discussed further below with respect to FIG. 2.

In some examples, crowdsourced data 112 received by the image upsampling system 100 can be processed by the crowdsourced data pre-processor 126 to determine second location data 124 associated with high resolution images 110, convert the high resolution images 110 to top-down images from other perspectives, and/or stitch high resolution images 110 together prior to the crowdsourced data 112 being stored in the crowdsourced data repository 122. However, in other examples, crowdsourced data 112 received by the image upsampling system 100 can be stored in the crowdsourced data repository 122, and the crowdsourced data pre-processor 126 can access crowdsourced data 112 in the crowdsourced data repository 122 to determine second location data 124 associated with high resolution images 110, convert the high resolution images 110 to top-down images from other perspectives, and/or stitch high resolution images 110 together.

A model training system 134, associated with the image upsampling system 100, can use a training data set 136 to generate and/or train the upsampling model 102. The training data set 136 can include pairs of low resolution images 104 and high resolution images 110 that depict the same geographical areas. Low resolution images 104 and high resolution images 110 can be paired in the training data set 136 based on first location data 118 and second location data 124 indicating that that the low resolution images 104 and high resolution images 110 that depict the same geographical areas. The model training system 134, or another element of the image upsampling system 100, can generate or prepare the training data set 136 by identifying high resolution images 110 and corresponding second location data 124 in the crowdsourced data repository 122, and identifying low resolution images 104 in the remote sensing data repository 116 that are associated with first location data 118 corresponding with the second location data 124.

For example, second location data 124 may indicate that a high resolution image in the crowdsourced data 112 depicts a particular geographical area. In some examples, the high resolution image may be an image swath or other image that has been stitched together by the image stitcher 132 from multiple high resolution images 110 that depict smaller portions of the geographical area. The model training system 134 can identify a low resolution image in the remote sensing data repository 116 that, based on first location data 118, depicts the same particular geographical area as the high resolution image in the crowdsourced data 112. The model training system 134 can prepare the training data set 136 such that the low resolution image and the high resolution image that both depict the same geographical area are paired together within the training data set 136.

In some examples, the model training system 134 may identify a swath of high resolution images 110, or another collection of high resolution images 110, that have been stitched together by the image stitcher 132 to depict a larger geographical area than may be depicted by a single high resolution image. The model training system 134 can accordingly identify at least a portion of a low resolution image that depicts the same geographical area as the stitched-together high resolution images 110, and pair the portion of a low resolution image and the stitched-together high resolution images 110 in the training data set 136. For example, if the model training system 134 identifies a swath of stitched-together high resolution images 110 generated from dashcam images that were captured as a vehicle traveled along a road, the model training system 134 may isolate a portion of a low resolution satellite image that depicts the same areas along that road, and mask out or delete other portions of the low resolution satellite image that depict other areas that are not depicted in the stitched-together swath of high resolution dashcam images. Accordingly, the model training system 134 can pair, in the training data set 136, the stitched-together swath of high resolution images that depict areas along the road with corresponding portions of the low resolution satellite image that also depict the same areas along that road. For example, if the swath of stitched-together high resolution images 110 has an irregular shape that corresponds to turns in the road, the model training system 134 can identify, in the training data set 136, corresponding portions of a square or rectangular satellite image that have the same shape as the swath of stitched-together high resolution images 110 and that depict the same areas along the road.

The model training system 134 can use pairs of low resolution images and high resolution images, depicting the same geographical areas, to train the upsampling model 102. The upsampling model 102 can be a machine learning model, such as a machine learning model based on convolutional neural networks, recurrent neural networks, other types of neural networks, nearest-neighbor algorithms, regression analysis, deep learning algorithms, Gradient Boosted Machines (GBMs), Random Forest algorithms, and/or other types of artificial intelligence or machine learning frameworks.

For example, the upsampling model 102 can be diffusion model. The diffusion model can be a super-resolution model based on a neural network, such as a latent variable model that is trained using variational inference to determine a Markov chain of operations that can generate a high resolution image from a low resolution image.

The model training system 134 can, for example, train the upsampling model 102 by beginning with a high resolution image in the training data set 136 and using image processing operations to degrade the image until the degraded image matches the corresponding low resolution image in the training data set 136 to at least a threshold degree. The model training system 134 can also train the upsampling model 102 to identify image processing operations that can upsample the degraded image, generated by degrading the original high resolution image in the training data set 136, into an upsampled image that matches the original high resolution image in the training data set 136 to at least a threshold degree. Such image processing operations that can be used to upsample the degraded image can, for example, substantially reverse the image processing operations used to generate the degraded image.

As an example, the model training system 134 can train the upsampling model 102 by determining image processing operations for a downsampling approach that can degrade a high resolution image in the training data set 136 into a degraded image that substantially matches a corresponding low resolution image in the training data set 136. The image processing operations for the downsampling approach can include adding Gaussian noise and/or other noise to the high resolution image, decreasing a number of pixels in the high resolution image, and/or otherwise degrading the high resolution image until an offset difference between the degraded image and the corresponding low resolution image is less than a threshold difference. If the offset difference between the degraded image and the corresponding low resolution image is not less than the threshold difference, the model training system 134 can train the upsampling model 102 by applying additional image processing operations to further degrade the image, and/or by reversing previously-applied image processing operations and applying different image processing operations to degrade the image, until the offset difference between the degraded image and the corresponding low resolution image is less than the threshold difference. The model training system 134 can thus train the upsampling model 102 to determine a Markov chain of image processing operations that can be used in a downsampling approach to convert a high resolution image of a geographical area from the crowdsourced data 112 into a degraded low resolution image that substantially matches the corresponding low resolution image of the geographical area from the remote sensing data 106.

Based on the degraded low resolution image, generated from an original high resolution image in the training data set 136 via the image processing operations of the downsampling approach discussed above, the model training system 134 can also or additionally train the upsampling model 102 to determine image processing operations for an upsampling approach that can convert the degraded low resolution image into a high resolution upsampled image that substantially matches the original high resolution image in the training data set 136. For example, based on the Markov chain of image processing operations that can be used in the downsampling approach, the model training system 134 can train the upsampling model 102 to determine a Markov chain of image processing operations that reverses the downsampling approach and can instead be used in an upsampling approach to upsample low resolution images.

For example, the model training system 134 can train the upsampling model 102 to learn a chain of operations for a downsampling approach that converts a high resolution image in the training data set 136 into a degraded low resolution image that substantially matches the associated low resolution image in the training data set 136. Based on having identified the chain of operations for the downsampling approach, the model training system 134 can train the upsampling model 102 to determine a chain of operations, such as reverse Markov transitions, that is most likely to reverse the operations of the downsampling approach and can be used to substantially re-create the original high resolution image in the training data set 136 from the degraded low resolution image or the low resolution image in the training data set 136. For instance, while the Markov chain of operations for the downsampling approach can include operations to add noise, remove pixels, and/or otherwise degrade the image, the model training system 134 can train the upsampling model 102 to determine a chain of operations for an upsampling approach that includes operations to remove noise, add pixels, and/or otherwise improve the image in order to reverse the operations used in the downsampling approach.

The model training system 134 can train the upsampling model 102 by applying image processing operations for the upsampling approach until an offset difference between the high resolution upsampled image generated via the upsampling approach and the original high resolution image in the training data set 136 is less than a threshold difference. If the offset difference between the high resolution upsampled image and the corresponding original high resolution image is not less than the threshold difference, the model training system 134 can train the upsampling model 102 by applying additional image processing operations to further upsample the image, and/or by reversing previously-applied image processing operations and applying different image processing operations to upsample the image, until the offset difference between the high resolution upsampled image and the corresponding original high resolution image is less than the threshold difference.

The upsampling model 102 may be trained, in some examples, on pairs of low resolution images 104 and high resolution images 110 corresponding to the same geographical areas until the upsampling model 102 is validated based on a validation subset of the training data set. For example, the model training system 134 can train the upsampling model 102 as described above to determine a chain of operations for an upsampling approach. The upsampling approach can be tested on a validation subset of other pairs of low resolution images 104 and high resolution images 110 corresponding to the same geographical areas that were not used to train the upsampling model 102, to determine whether the upsampling approach is able to upsample the low resolution images 104 into upsampled images that substantially match the corresponding high resolution images 110 in the validation subset. If the upsampling approach is not able to upsample the low resolution images 104 into upsampled images that substantially match the corresponding high resolution images 110, the model training system 134 can continue to train the upsampling model 102 based on additional pairs of low resolution images 104 and high resolution images 110 in the training data set 136. For instance, the chain of operations for the downsampling approach, and/or the corresponding reversed chain of operations for the upsampling approach, can be adjusted during continued training of the upsampling model 102 until the upsampling approach is validated according to the validation subset.

By training the upsampling model 102 on multiple pairs of low resolution images 104 from remote sensing sources 114 and high resolution images 110 from crowdsourcing sources 120 that depict the same geographical areas, the upsampling model 102 can be trained to determine a chain of operations for an upsampling approach. The chain of operations can be a Markov chain of operations, which can be a stochastic model indicating probabilities of next operations to be performed on an image based on the state of the image after a preceding operation in the chain.

The image upsampling system 100 can accordingly apply the upsampling model 102 to use the upsampling approach and convert low resolution images 104 from remote sensing sources 114 into corresponding upsampled images 108 that have higher resolutions, and depict more detail, than the low resolution images 104 from the remote sensing sources 114. For example, as discussed above, a low resolution image of a geographical area from the remote sensing sources 114 may have a pixel resolution that is too low to depict road markings, road cracks, individual plants, individual vehicles, and/or other relatively small details. However, the upsampling model 102 can be trained as discussed above to determine a chain of image processing operations for an upsampling approach that can convert low resolution images 104 that do not depict such small details into high resolution images 110 that do depict such small details. Accordingly, the upsampling model 102 can apply the upsampling approach to the low resolution image to generate a corresponding upsampled image that may depict road markings, road cracks, individual plants, individual vehicles, and/or other relatively small details that are not depicted in the original low resolution image. For instance, in some examples the upsampled images 108 can have a resolution that is 100 times more detailed than the resolution of the original low resolution images 104, or any other improved resolution relative to the original low resolution images 104.

In some examples, the model training system 134 can execute in a service provider network, such as cloud computing environment, to train the upsampling model 102, as discussed further below with respect to FIG. 6. The trained upsampling model 102 may execute in the service provider network, in some examples, to generate upsampled images 108 from new low resolution images 104 received from remote sensing sources 114. However, in other examples, the trained upsampling model 102 may be deployed to execute via servers and/or other computing resources associated with one or more remote sensing sources 114, at edge computing elements, and/or at other computing resources to generate upsampled images 108 from new low resolution images 104 obtained or provided by remote sensing sources 114.

In some examples, the upsampling model 102 can be used to generate high resolution upsampled images 108 of geographical areas that are not depicted by crowdsourced high resolution images 110. For example, a satellite-captured low resolution image may depict a country road that is traveled relatively infrequently. However, the upsampling model 102 can have been trained in part on high resolution images 110 of other geographical areas that show road details, and can have learned an upsampling approach that can be used to generate, from low resolution images 104, high resolution images that show such road details. Accordingly, the upsampling model 102 can apply the upsampling approach to generate, based on the low resolution image of the country road, a corresponding higher-resolution upsampled image that depicts road details that are likely to be present on the country road.

The upsampling model 102 may output upsampled images 108, generated based on low resolution images 104 from remote sensing sources 114, in upsampled remote sensing data 138. The upsampled remote sensing data 138 can indicate that the upsampled images 108 are associated with the same or similar first location data 118 as the original low resolution images 104. For example, if a particular satellite-captured low resolution image is associated with first location data 118 indicating that the low resolution image depicts a particular geographical area, the upsampled remote sensing data 138 produced by the upsampling model 102 can include an upsampled image that has a higher resolution than the satellite-captured low resolution image and the same or similar first location data 118 indicating that the higher-resolution upsampled image also depicts the same particular geographical area as the satellite-captured low resolution image. Accordingly, a consumer of the upsampled remote sensing data 138 can use the upsampled images 108 to view and/or analyze geographical areas instead of, or in addition to, the original low resolution images 104 of those geographical areas provided by the remote sensing sources 114. As an example, a user interface may be configured to allow a user to view low resolution images 104 of a geographical region, but use higher-resolution upsampled images 108 to zoom in and view more detailed upsampled depictions of smaller areas within that geographical region. As another example, a consumer of remote sensing data 106 may choose to receive and/or view higher-resolution upsampled images 108 of a geographical area that have been generated by the upsampling model 102 instead of receiving and/or viewing the original low resolution images 104 of the geographical area captured by the remote sensing sources 114.

In some examples, the upsampling model 102 may be applied to all new low resolution images 104 that are received from and/or obtained by remote sensing sources 114 to generate corresponding upsampled images 108. As an example, the upsampling model 102 can be used substantially immediately, or after a threshold period of time, when any new low resolution images 104 are received by the image upsampling system 100 or are added to the remote sensing data repository 116. As another example, the upsampling model 102 can be applied to batches of recently-received low resolution images 104. For instance, the upsampling model 102 can be executed once per day, once per hour, or on any other schedule to generate upsampled images 108 from any new low resolution images 104. As yet another example, a trained version of the upsampling model 102 can be executed via servers and/or other computing resources associated with one or more remote sensing sources 114, such that the remote sensing sources 114 can use to the trained version of the upsampling model 102 to generate upsampled images 108 from new low resolution images 104 captured by the remote sensing sources 114.

In other examples, the upsampling model 102 may be applied to selected sets of low resolution images 104, low resolution images 104 associated with particular consumers, and/or other subsets of the total number of low resolution images 104 that are captured by one or more remote sensing sources 114, received by the image upsampling system 100, and/or are stored in the remote sensing data repository 116. For example, requests from consumers may identify particular geographical areas and request that upsampled images 108 be generated from low resolution images 104 that depict those particular geographical areas.

As an example, a consumer may be interested in using remote sensing data 106 to monitor the state of a field of crops. However, the consumer may feel that the resolution of images captured by satellites that depict the field of crops is too low to monitor the state of the crops, and/or may not want to pay a satellite provider to task other satellites with better higher-resolution cameras to pass over the field of crops. Accordingly, the consumer can submit a request to the image upsampling system 100 to generate upsampled images 108 of the field of crops based on corresponding satellite-captured low resolution images 104 of the field of crops. In some examples, such a request may indicate that the upsampled images 108 are to be generated based on the most recent satellite-captured low resolution images 104 of the field of crops once per day, once per month, or on any other schedule.

The upsampling model 102 can be re-trained periodically or occasionally based on a new or updated training data set 136. For example, as additional remote sensing data 106 and corresponding additional crowdsourced data 112 is received over time, new or updated pairs of low resolution images 104 and high resolution images 110 that correspond to the same geographical areas can be added to the training data set 136, and the upsampling model 102 can be re-trained based on the updated training data set 136 that includes the new or updated pairs of low resolution images 104 and high resolution images 110.

In some examples, the upsampling model 102 may initially be trained based in part on a pair of images that includes a first low resolution image 104 of a particular geographical area and a first high resolution image 110 of the same particular geographical area that was captured at a first point in time. However, the image upsampling system may later receive a second high resolution image 110 of the same particular geographical area that was captured at a later second point in time. The second high resolution image 110 of the particular geographical area may be fresher, and thus depict new and/or changed details within the particular geographical area, than the first high resolution image 110 that was used to initially train the upsampling model 102. Accordingly, the upsampling model 102 may be retrained based at in part on a new or updated training data set 136 that pairs the first low resolution image 104 with the newer second high resolution image 110, and/or that pairs the newer second high resolution image 110 with a similar newer second low resolution image 104 of the particular geographical area.

In some examples, re-training of the upsampling model 102 can be triggered based on a determination that a geographical area has changed beyond a threshold degree based an analysis of high resolution images 110 in crowd-sourced data 112 of the geographical area over a period of time. For example, image analysis operations may indicate that high resolution images 110 in batches of crowdsourced data 112 received over a three-month period show that features of the particular geographical area have signifi-cantly changed during that three-month period, due to con-struction, vegetation changes, or any other reason. Such image analysis operations may, for instance, identify fea-tures in older high resolution images 110 of the particular geographical area and determine if newer high resolution images 110 of the same particular geographical area depict the same features, and/or if differences between the features in the new and old high resolution images 110 exceed a threshold level. Accordingly, changes to the particular geo-graphical area shown in the high resolution images 110 can trigger re-training of the upsampling model 102 based at least in part on recent pairings of high resolution images 110 and low resolution images 104 that depict the particular geographical area and may be more likely to depict the new changed state of the particular geographical area. However, if high resolution images 110 in crowdsourced data 112 that depict a different geographical area indicate that the different geographical area has not significantly changed, for instance because differences between features shown in new and old high resolution images 110 of the different geographical area do not exceed a threshold level, conditions triggering re-training of the upsampling model 102 based on new high resolution images 110 of the different geographical area may not be met.

In some examples, the image upsampling system 100 may use the upsampling model 102 to generate a first upsampled image from a particular low resolution image provided in remote sensing data 106. If the image upsampling system 100 later re-trains the upsampling model 102 as described above, the image upsampling system 100 may in some examples use the re-trained upsampling model 102 to gen-erate a second upsampled image from the same particular low resolution image. Accordingly, while the first upsampled image generated from a particular low resolution image may depict details, the second upsampled image generated from the same particular low resolution image may depict additional and/or different details in response to changes in the upsampling approach due to the re-training of the upsampling model 102 based on additional and/or more recent data in the training data set 136.

As discussed above, the image upsampling system 100 can use the upsampling model 102 to convert low resolution images 104 in remote sensing data 106 into higher-resolution upsampled images 108 that depict geographical areas at a higher level of detail than the low resolution images 104. Consumers of remote sensing data 106 can accordingly access, view, and/or use the higher-resolution upsampled images 108 instead of, or in addition to, the low resolution images 104. Accordingly, consumers can use the upsampled images 108 to view or monitor details of the geographical areas that may not be depicted in the low resolution images 104. Consumers can thus avoid requesting that remote sensing sources 114 re-task satellites or otherwise adjust operations to obtain higher resolution remotely-sensed images, thereby saving on costs associated with adjusting such operations and avoiding disruptions to operations of the remote sensing sources 114. Examples of operations to prepare and/or update the training data set 136, to train and/or re-train the upsampling model 102 based on the training data set 136, and to use the trained upsampling model 102 to convert low resolution images 104 in remote sensing data 106 into higher-resolution upsampled images 108 are discussed further below with respect to FIGS. 2-5.

Figure 2:
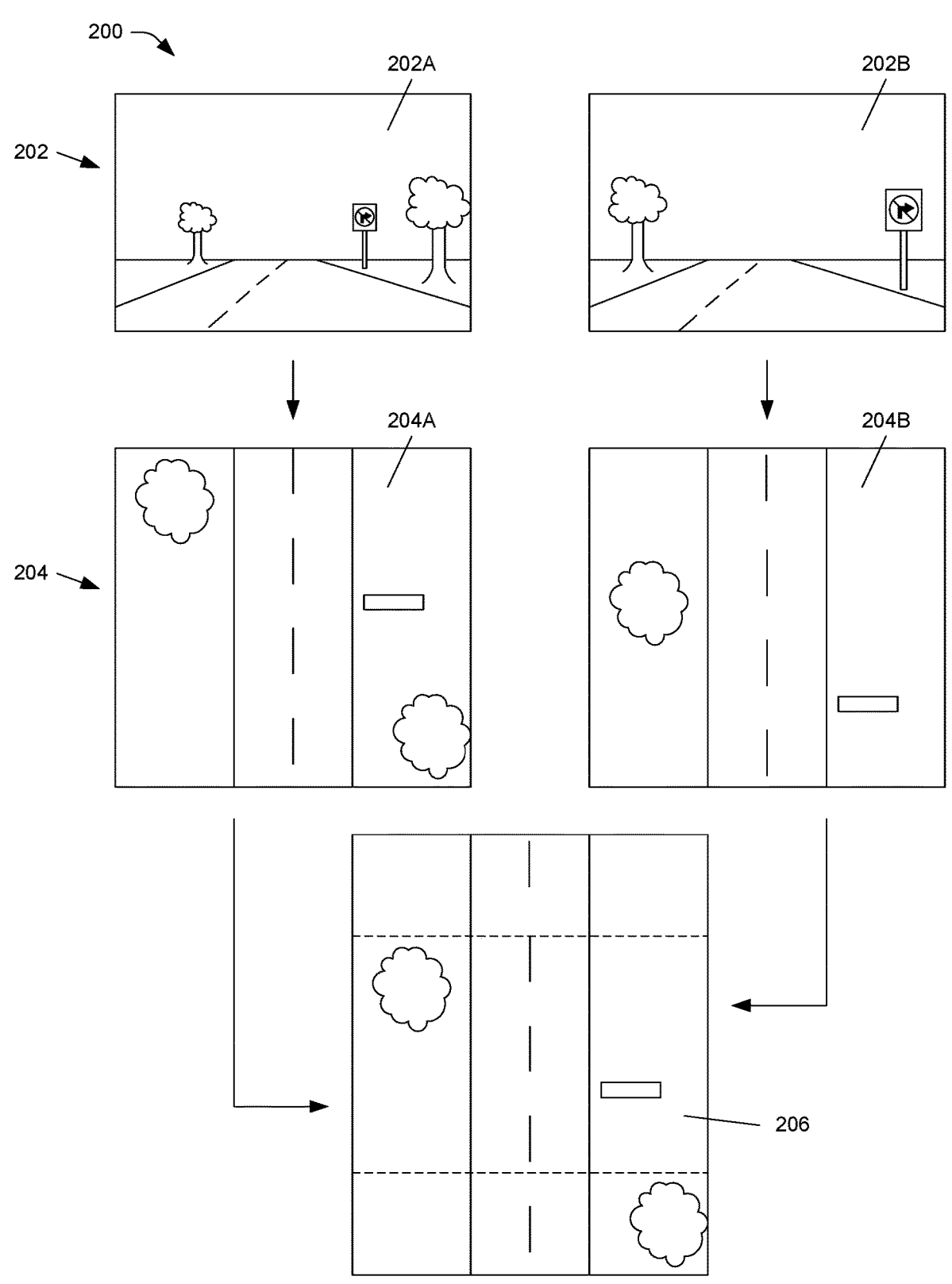
FIG. 2 shows an example of the image upsampling system converting high resolution images in crowdsourced data to a top-down perspective, and stitching the converted high resolution images together.

FIG. 2 shows an example 200 of the image upsampling system 100 converting high resolution images 110 in crowd-sourced data 112 to a top-down perspective and stitching the converted high resolution images 110 together. As discussed above, the high resolution images 110 in crowdsourced data 112 may be dashcam images or other images that have a front-facing perspective or another perspective that is dif-ferent than a top-down perspective that corresponds to the perspective of the low resolution images 104 in the remote sensing data 106. However, the crowdsourced data pre-processor 126 can use the perspective modifier 130 to convert the high resolution images 110 into the top-down perspective. The high resolution images 110 in crowd-sourced data 112 may also depict a relatively small geo-graphical area. However, the crowdsourced data pre-proces-sor 126 can use the image stitcher 132 to combine multiple high resolution images 110 into a high resolution image of a larger geographical area that may correspond to all or a portion of a geographical area depicted by a low resolution image in the remote sensing data 106.

For example, the high resolution images 110 shown in FIG. 2 can include a series of dashcam images 202 captured by a dashcam mounted in a vehicle, such as dashcam image 202A and dashcam image 202B. The dashcam images 202 may be still images or frames of video frames captured by the dashcam. The dashcam can be associated with a user or other entity that serves as one of the crowdsourcing sources 120, such that the dashcam images 202 can be high resolu-tion images 110 in crowdsourced data 112 provided to the image upsampling system 100. In some examples, the dashcam or a corresponding element of the crowdsourcing source may also tag the dashcam images 202 with GPS coordinates or other types of second location data 124 indicating locations at which the dashcam captured the dashcam images 202. In other examples, the dashcam images 202 may be provided by the crowdsourcing source without corresponding second location data 124, and the location determiner 128 of the crowdsourced data pre-processor 126 can use visual odometry, image recognition operations, and/or other image processing operations to derive second location data 124 associated with the dashcam images 202.

As shown in FIG. 2, the dashcam images 202 can have a front-facing perspective that depicts a road and surrounding areas in front of the vehicle on which the dashcam is mounted. The dashcam can capture the dashcam images 202 as the vehicle travels along the road, such that different dashcam images 202 can be high resolution images 110 that depict different areas on and along the road. For instance, dashcam image 202A depicts a front-facing view from a first position on the road, while dashcam image 202B depicts a front-facing view from a second position that is farther down the road than the first position.

The perspective modifier 130 can use geometry transform operations, perspective warping operations, perspective transformation operations, image projection operations, matrices, and/or other operations and image processing techniques to convert the front-facing dashcam images 202 into corresponding top-down images 204. For instance, the perspective modifier 130 can convert dashcam image 202A into top-down image 204A, and convert dashcam image 202B into top-down image 204B. In some examples, the perspective modifier 130 can use a single column of pixels in a front-facing dashcam image to generate a corresponding section of a top-down image that extends away from a position corresponding to the dashcam. In other examples, the perspective modifier 130 can be a machine learning model that has been trained to determine perspective transformation operations based on historical pairs of front-facing images and corresponding top-down images, and can use the perspective transformation operations to convert the front-facing dashcam images 202 into corresponding top-down images 204. Similar to the dashcam images 202 that depict areas in front of the position of the dashcam from a front-facing perspective, the top-down images 204 can also depict the areas in front of the position of the dashcam from a top-down perspective.

After the front-facing dashcam images 202 have been converted into the corresponding top-down images 204, the image stitcher 132 can combine the top-down images 204 into a high resolution image 206 that depicts a larger area than is depicted in the individual top-down images 204. For instance, because the top-down images 204 depict different areas but may have some overlapping elements, the image stitcher 132 can line up overlapping portions of the top-down images 204 that depict the same features, and combine the top-down images 204 to generate the high resolution image 206 of a larger area that includes some or all of the different areas depicted by the individual top-down images 204.

For example, the top-down image 204A can depict a first area on and around a road, while the top-down image 204B can depict a second area on and around the road that is farther along the road than the first area. Accordingly, the image stitcher 132 can generate the high resolution image 206 by combining depictions of the first area and the second area from the top-down image 204A and the top-down image 204B, such that the high resolution image 206 depicts a larger area that includes both the first area and the second area.

Although the example 200 shown in FIG. 2 shows two top-down images 204 being combined into the high resolution image 206, the image upsampling system 100 can convert additional dashcam images 202 taken at additional locations along the road into additional top-down images 204, and stitch the additional top-down images 204 into the high resolution image 206. Accordingly, the high resolution image 206 generated based on a set of dashcam images 202 taken along a segment of a road traveled by a vehicle can be an image swath that depicts areas extending along that segment of the road.

In some examples, the image stitcher 132 can stitch together top-down images 204 generated from successive dashcam images 202 by using or prioritizing portions of the top-down images 204 that have more image detail than other portions of the top-down images 204. For example, pixels proximate to the bottom of dashcam image 202B can depict a portion of the road that is closest to the vehicle at a higher level of detail than pixels of earlier-captured dashcam image 202A that depict the same portion of the road from farther away from the vehicle. Accordingly, the image stitcher 132 can identify overlapping portions of top-down images 204 generated from the dashcam images 202 that depict the same areas, and use or prioritize segments of the overlapping top-down images 204 that depict the areas at higher levels of detail when stitching the top-down images together into the high resolution image 206.

The image stitcher 132 can also add or update second location data 124 associated with the high resolution image 206, which can indicate the location and/or boundaries of the larger geographical location depicted in the stitched-together high resolution image 206. The stitched-together high resolution image 206 and corresponding second location data 124 can be stored in the crowdsourced data repository 122 as crowdsourced data 112, such that the stitched-together high resolution image 206 can be used within the training data set 136 to train the upsampling model as described herein.

Figure 3:
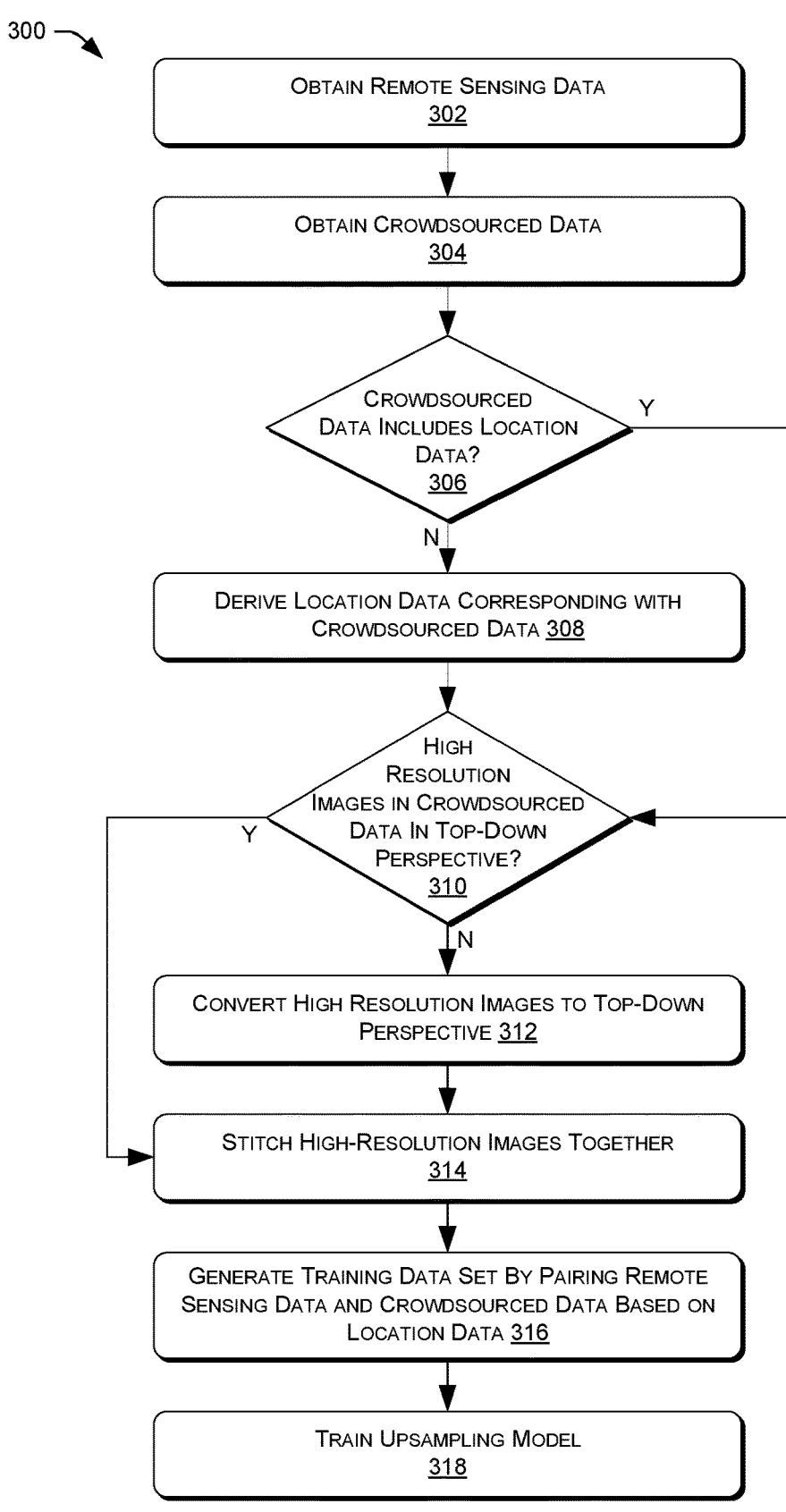
FIG. 3 is a flow diagram of an illustrative process for generating a training data set, including pairs of low resolution images and high resolution images associated with the same geographical areas, that can be used to train the upsampling model.

FIG. 3 is a flow diagram of an illustrative process 300 for generating the training data set 136, including pairs of low resolution images 104 and high resolution images 110 associated with the same geographical areas, that can be used to train the upsampling model 102. Process 300 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At block 302, the image upsampling system 100 can obtain remote sensing data 106. The remote sensing data 106 can include low resolution images 104 as well as first location data 118 indicting geographical areas depicted in the low resolution images 104. The image upsampling system 100 can obtain the remote sensing data 106 from one or more remote sensing sources 114 at block 302, such as systems associated with satellites, UAVs, other aerial vehicles, and/or other types of vehicles or equipment that may fly or pass over geographical areas to capture remote sensing data 106 associated with the geographical areas.

At block 304, the image upsampling system 100 can obtain crowdsourced data 112. The crowdsourced data 112 can include high resolution images 110 depicting geographical areas. In some examples, the crowdsourced data 112 may also include second location data 124 identifying the geographical areas depicted in the high resolution images 110. The image upsampling system 100 can obtain the crowdsourced data 112 from one or more crowdsourcing sources 120 at block 304, such as public and/or private sources that provide high resolution images 110 captured using dashcams, other types of vehicle-mounted cameras, cell phone cameras, and/or other types of cameras.

The high resolution images 110 in the crowdsourced data 112 obtained at block 304 can depict geographical areas in a higher resolution, and with more detail, than the low resolution images 104 in the remote sensing data 106 obtained at block 302. For example, the high resolution images 110 may be more detailed than the low resolution images 104 at least in part because the high resolution images 110 are captured from positions that are lower to the ground of geographical areas than positions at which remote sensing sources 114 capture the low resolution images 104.

At block 306, the image upsampling system 100 can determine whether the crowdsourced data 112 obtained at block 304 includes second location data 124 indicating the locations of geographical areas depicted in the high resolution images 110. In some examples, the crowdsourced data 112 obtained at block 304 may include second location data 124, such as GPS coordinates and/or other types of location data, indicating locations of the geographical areas depicted in the high resolution images 110. However, in other examples the crowdsourced data 112 obtained at block 304 may omit second location data 124.

Accordingly, if the image upsampling system 100 determines at block 306 that the crowdsourced data 112 obtained at block 304 does not include second location data 124 (Block 306-No), the image upsampling system 100 can derive second location data 124 associated with the crowdsourced data 112 at block 308.

For example, at block 308, the location determiner 128 of the image upsampling system 100 can use visual odometry, image recognition operations, machine learning algorithms, and/or other operations to derive second location data 124 associated with the crowdsourced data 112. The location determiner 128 may derive the second location data 124 by identifying features depicted in the high resolution images 110 that are associated with geographical locations, identifying differences within a series of high resolution images 110 that indicate a trajectory of a vehicle or other equipment over a period of time that is associated with a travel route through a geographical area, by using machine learning algorithms trained based on location data associated with a sample set of images, and/or by otherwise analyzing the high resolution images 110 to identify geographical areas that are depicted in the high resolution images 110.

If the image upsampling system 100 determines at block 306 that the crowdsourced data 112 obtained at block 304 does include second location data 124 (Block 306-Yes), or after the image upsampling system 100 derives the second location data 124 associated with the crowdsourced data 112 at block 308, the image upsampling system 100 can determine at block 310 whether high resolution images 110 in the crowdsourced data 112 obtained at block 304 depict the geographical areas from a top-down perspective. In some examples, the high resolution images 110 in the crowdsourced data 112 obtained at block 304 may be top-down images provided by drones or other crowdsourcing sources 120. However, in other examples the high resolution images 110 in the crowdsourced data 112 obtained at block 304 may be dashcam images, cell phone camera images, and/or other types of images that are front-facing images or have other perspectives different from a top-down perspective.

If the image upsampling system 100 determines at block 310 that the high resolution images 110 in the crowdsourced data 112 are not in a top-down perspective (Block 310-No), for instance if the high resolution images 110 are dashcam images, cell phone camera images, and/or other types of images that are front-facing images or have other perspectives different from a top-down perspective, the image upsampling system 100 can convert the high resolution images 110 to a top-down perspective at block 312. For example, at block 312, the perspective modifier 130 of the image upsampling system 100 can use geometry transform operations, perspective warping operations, perspective transformation operations, image projection operations, matrices, and/or other operations and image processing techniques to convert the high resolution images 110 into top-down images.

If the image upsampling system 100 determines at block 310 that the high resolution images 110 in the crowdsourced data 112 obtained at block 304 are in a top-down perspective (Block 310-Yes), or after the image upsampling system 100 converts the high resolution images 110 into the top-down perspective at block 312, the image upsampling system 100 can stitch high resolution images 110 together at block 314. For example, the image stitcher 132 of the image upsampling system 100 can combine multiple top-down high resolution images 110 of geographical areas into a high resolution image of a larger geographical area, such as a swath of images that depict a segment of a road and/or areas alongside the segment of the road.

At block 316, the image upsampling system 100 can generate the training data set 136 by pairing remote sensing data 106 and crowdsourced data 112 based on location data, such that the training data set 136 includes pairs of low resolution images 104 and high resolution images 110 that depict the same geographical areas. Low resolution images 104 and high resolution images 110 paired in the training data set 136 can be top-down perspective images of the same geographical areas.

For example, the image upsampling system 100 can identify a high resolution image and corresponding second location data 124 in the crowdsourced data repository 122. The image upsampling system 100 can also identify a low resolution image in the remote sensing data repository 116 that, based on first location data 118 associated with the low resolution image and the second location data 124 associated with the high resolution image, depicts the same geographical area as the high resolution image. The image upsampling system 100 can accordingly pair the high resolution image and the low resolution image, that depict the same geographical area, within the training data set 136.

In some examples, the image upsampling system 100 may pair a high resolution image with corresponding sub-sections of a low resolution image that depict the same geographical area as the high resolution image at block 316, for instance if the full low resolution image depicts geographical areas outside of the geographical area depicted in the high resolution image. As an example, if a full low resolution image depicts a square mile area, but the high resolution image depicts a swath extending along a particular road within that square mile area, the image upsampling system 100 may pair the high resolution image swath with particular portions of the full low resolution image that also depict areas on and along the particular road within the square mile area.

After generating the training data set 136 at block 316, the training data set 136 can be used to train the upsampling model 102 at block 318. Training of the upsampling model 102 is discussed further below with respect to FIG. 4. In some examples, the process 300 shown in FIG. 3 can be used to update the training data set 136 and/or generate new training data sets over time, for instance based on new remote sensing data 106 and/or crowdsourced data 112 associated with the same geographical areas that are received over a period of time. Such a new and/or updated training data set 136 can be used to periodically or occasionally retrain the upsampling model 102 as described herein.

Figure 4:
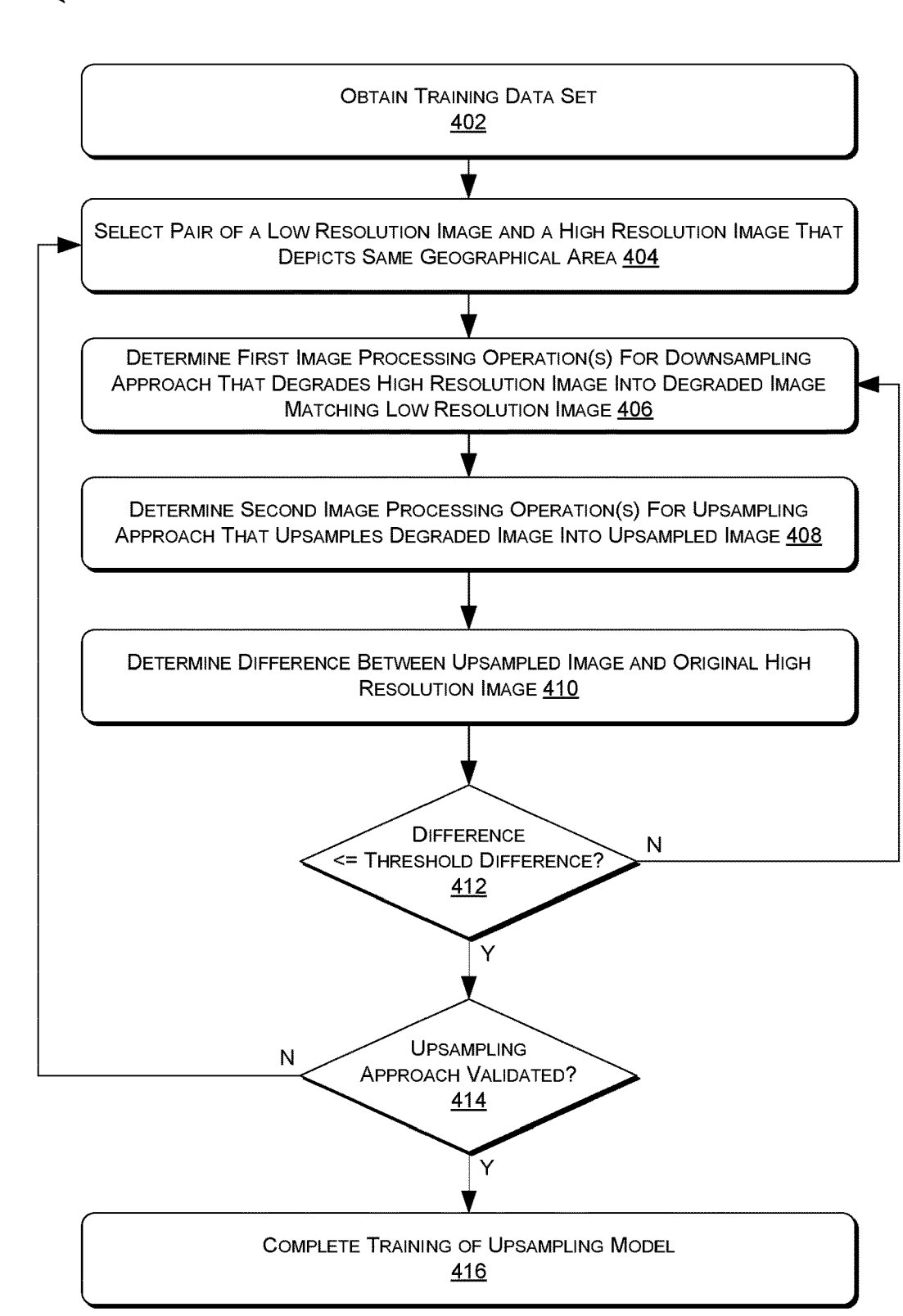
FIG. 4 is a flow diagram of an illustrative process for training the upsampling model, based on the training data set that includes pairs of low resolution images and high resolution images that depict the same geographical areas.

FIG. 4 is a flow diagram of an illustrative process 400 for training the upsampling model 102, based on the training data set 136 that includes pairs of low resolution images 104 and high resolution images 110 that depict the same geographical areas. As discussed above, in some examples the upsampling model 102 can be diffusion model, such as a neural network, super-resolution model, and/or latent variable model that is trained using variational inference to determine a Markov chain of operations that can generate a high resolution image from a low resolution image. In other examples, the upsampling model 102 can be a convolutional model or other type of machine learning model that can be trained as shown in FIG. 4. Process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At block 402, the image upsampling system 100 can obtain the training data set 136. The image upsampling system 100 can generate and/or prepare the training data set 136 using the process 300 described above with respect to FIG. 3. The training data set 136 can include pairs of low resolution images 104 and high resolution images 110 that depict the same geographical areas, based on corresponding first location data 118 and second location data 124. The low resolution images 104 can be provided as remote sensing data 106 from one or more remote sensing sources 114, while the corresponding high resolution images 110 in the training data set 136 can be provided as crowdsourced data 112 from one or more crowdsourcing sources 120.

At block 404, the image upsampling system 100 can select, from the training data set 136, a pair of a low resolution image and a high resolution image that depict the same geographical area. As discussed above, the low resolution image can have been provided in remote sensing data 106, while the high resolution image can have been provided in crowdsourced data 112.

At block 406, the image upsampling system 100 can determine first image processing operations for a downsampling approach that degrades the high resolution image selected at block 404 into a degraded low resolution image that substantially matches the corresponding low resolution image selected at block 404. For example, the image upsampling system 100 can add Gaussian noise and/or other noise to the high resolution image, decrease a number of pixels in the high resolution image, and/or otherwise degrade the high resolution image by applying first image processing operations. In some examples, the image upsampling system 100 can determine a first Markov chain of image processing operations that can be used in the downsampling approach to convert the high resolution image selected at block 404 into a degraded image that matches, or is substantially equivalent to, the corresponding low resolution image selected at block 404.

In some examples, the image upsampling system 100 can determine a difference between the degraded image, generated by applying the first image processing operations to the high resolution image selected at block 404, and the corresponding low resolution image selected at block 404. For example, the image upsampling system 100 can compare the degraded image with the low resolution image to find differences in pixel values and/or other difference or offset information. The image upsampling system 100 can determine whether the difference between the degraded image and the corresponding low resolution image is less than or equal to a threshold difference. The threshold difference can be a value indicating that, if the difference between the degraded image and the low resolution image is less than or equal to the threshold difference, the degraded image matches, or is substantially equivalent to, the low resolution image. If the image upsampling system 100 determines that the difference between the degraded image and the corresponding low resolution image is above the threshold difference, the image upsampling system 100 can continue to apply different and/or additional image processing operations to further degrade the high resolution image and/or degrade the high resolution image in different ways. Accordingly, the image upsampling system 100 may apply different and/or additional image processing operations at block 406 until the degraded image generated from the original high resolution image selected at block 404 matches, or is substantially equivalent to, the corresponding low resolution image selected at block 404.

After determining and applying the first image processing operations of the downsampling approach to generate the degraded image at block 406, at block 408 the image upsampling system 100 can determine second image processing operations for an upsampling approach that upsamples the degraded low resolution image generated at block 406 into an upsampled high resolution image that substantially matches the original high resolution image selected at block 404. The second image processing operations determined at block 408 can include operations to remove noise, add pixels, and/or otherwise improve the image in order to reverse the operations used in the downsampling approach and/or upsample the degraded image into an upsampled high resolution image that substantially matches the original high resolution image. For example, based on a first Markov chain of image processing operations that can be used in the downsampling approach determined at block 406, at block 408 the image upsampling system 100 can determine a second Markov chain of image processing operations that reverses the downsampling approach and can instead be used in the upsampling approach.

At block 410, the image upsampling system 100 can determine a difference between the upsampled image, generated at block 408 by applying the second image processing operations of the upsampling approach to the degraded image generated at block 406, and the original resolution image selected at block 404. For example, the image upsampling system 100 can compare the upsampled image with the original high resolution image to find differences in pixel values and/or other difference or offset information.

At block 412, the image upsampling system 100 can determine whether the difference between the upsampled image and the original high resolution image determined at block 410 is less than or equal to a threshold difference. The threshold difference can be a value indicating that, if the difference between the upsampled image and the original high resolution image is less than or equal to the threshold difference, the upsampled image matches, or is substantially equivalent to, the original high resolution image. If the image upsampling system 100 determines that the difference between the upsampled image and the original high resolution image is above the threshold difference (Block 412-No), the image upsampling system 100 can return to block 404 and/or block 406 to apply different and/or additional image processing operations during the downsampling approach and/or the upsampling approach. Accordingly, the image upsampling system 100 may apply different and/or additional image processing operations for the downsampling approach and/or the upsampling approach until an upsampled image generated via the upsampling approach from a degraded image, generated from the original high resolution image via the downsampling approach, matches or is substantially equivalent to the original high resolution image.

When the image upsampling system 100 determines that the difference between the upsampled image and the original high resolution image is less than or equal to the threshold difference (Block 412-Yes), the image upsampling system 100 can determine if the upsampling approach is validated at block 414, for example by testing the upsampling approach on a validation set of low resolution images 104 in the training data set 136 and determining if the upsampling approach can successfully upsample the low resolution images into higher-resolution images that match, or are substantially equivalent to, corresponding high resolution images 110 in the training data set 136. For instance, the image upsampling system 100 can use the chain of operations of the upsampling approach to upsample the low resolution images 104 into higher-resolution images, and determining whether a difference between the upsampled higher-resolution images and the corresponding high resolution images 110 in the training data set 136 is less than or equal to a threshold difference.

If the image upsampling system 100 determines that the upsampling approach is not validated (Block 414-No), the image upsampling system 100 may return to block 404 and select a different pair of a low resolution image and a high resolution image from the training data set 136, and use blocks 406 through 412 in association with the newly selected pair to adjust image processing operations associated with the downsampling approach and/or the upsampling approach. For example, the image upsampling system 100 may adjust the chain of operations associated with the downsampling approach based on image processing operations that successfully degrade the high resolution image of the newly selected pair into a degraded image that corresponds with the low resolution image of the newly selected pair, and/or can similarly adjust the chain of operations associated with the upsampling approach that reverses the operations of the downsampling approach and/or otherwise upsamples the degraded image into the original high resolution image.

The image upsampling system 100 can continue to train the upsampling model, by adjusting the chain of operations associated with the upsampling approach based on additional pairs of high resolution images 110 and low resolution images 104 in the training data set 136, until the chain of operations associated with the upsampling approach is validated at block 414 as being able to successfully upsample the validation set of low resolution images 104 in the training data set 136 into higher-resolution images that match, or are substantially equivalent to, corresponding high resolution images 110 in the training data set 136.

When the image upsampling system 100 determines that the upsampling approach is validated (Block 414-Yes), the image upsampling system 100 can complete training of the upsampling model 102 at block 416. The image upsampling system 100 can use the trained upsampling model 102 to generate upsampled images 108 from new low resolution images 104 received in remote sensing data 106, as discussed further below with respect to FIG. 5.

The image upsampling system 100 can repeat the process 400 shown in FIG. 4 to periodically or occasionally retrain the upsampling model 102. For example, when a new and/or updated training data set is generated using the process 300 shown in FIG. 3, the process 400 shown in FIG. 5 can be used to retrain the upsampling model 102. For instance, the training data set 136 may updated to pair new high resolution images 110 of a geographical area in newly-received crowdsourced data 112 with new and/or old low resolution images 104 of the same geographical area in remote sensing data 106. The image upsampling system 100 can use the process 400 shown in FIG. 4 to retrain the upsampling model 102 based on the new pairings of low resolution images 104 and high resolution images 110 in the updated training data set 136. For instance, the image upsampling system 100 can adjust the chain of operations associated with the downsampling approach based on finding image processing operations that successfully degrade the new high resolution images 110 into degraded images that correspond with associated low resolution images 104 in the updated training data set 136, and similarly adjust the chain of operations associated with the upsampling approach that reverses the operations of the downsampling approach and/or otherwise can upsample degraded images into higher-resolution images that match, or are substantially equivalent to, corresponding high resolution images 110 in the training data set 136.

Figure 5:
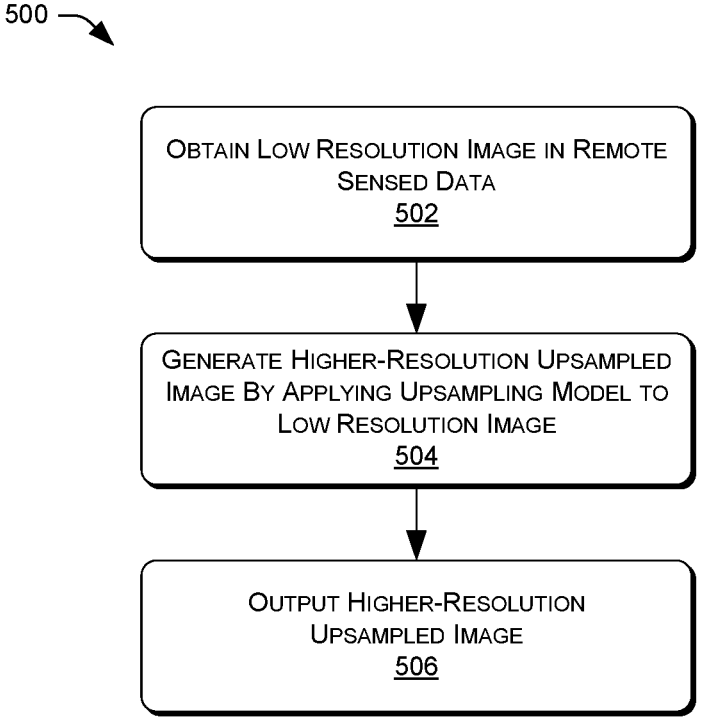
FIG. 5 is a flow diagram of an illustrative process for using the upsampling model to generate upsampled images from low resolution images in remote sensing data.

FIG. 5 is a flow diagram of an illustrative process 500 for using the upsampling model 102 to generate upsampled images 108 from low resolution images 104 in remote sensing data 106. The upsampling model 102 can be trained using the process 400 described above with respect to FIG. 4. After the upsampling model 102 is trained, the upsampling model 102 can be applied to low resolution images 104, such as low resolution images 104 in newly received remote sensing data 106, to convert the low resolution images 104 into higher-resolution upsampled images 108. Process 500 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At block 502, the image upsampling system 100 can obtain a low resolution image within remote sensing data 106. The image upsampling system 100 can obtain the low resolution image from a remote sensing source, such as provider of satellite images, drone images, aerial images, and/or other types of remote sensing data 106. In some examples, the image upsampling system 100 can select any low resolution image within a batch of newly-received remote sensing data 106 at block 502, and may repeat the operations of process 500 for any or all of the low resolution images 104 within the newly-received batch of remote sensing data 106. In other examples, the image upsampling system 100 can receive a request from a user or consumer of remote sensing data 106 that identifies a particular geographical area, and the image upsampling system 100 can select a low resolution image at block 502 that is associated with first location data 118 corresponding to the particular geographical area indicated in the request.

At block 504, the image upsampling system 100 can generate a higher-resolution upsampled image, corresponding to the low resolution image obtained at block 502, by applying the upsampling model 102 to the low resolution image. As described above, the image upsampling system 100 can train the upsampling model 102 to determine a chain of operations, such as image processing operations, for an upsampling approach that can be used to upsample low resolution images 104 into a higher resolution. Accordingly, at block 504, the image upsampling system 100 can use the chain of operations associated with the upsampling approach to modify the low resolution image and generate an upsampled image that has a higher resolution than the low resolution image.

For example, the upsampling model 102 can have been trained to determine a chain of operations for the upsampling approach, such as a Markov chain of operations indicating probabilities of next image processing operations to be performed on an image based on the state of the image after a preceding operation in the chain. The image upsampling system 100 can accordingly use the chain of operations to remove noise, add pixels, and/or otherwise improve the low resolution image by following the Markov chain of operations, based on a state of the image following a preceding operation, to modify the low resolution image and generate the upsampled image.

The image upsampling system 100 can associate the first location data 118, associated with the low resolution image obtained at block 502, or similar location with the upsampled image generated from the low resolution image at block 504. Accordingly, the first location data 118 or similar location data can indicate that the higher-resolution upsampled image depicts the same geographical area as the low resolution image.

At block 506, the image upsampling system 100 can output the upsampled image, generated using the upsampling model 102 at block 504, that corresponds to the low resolution image obtained at block 502. In some examples, the image upsampling system 100 can output the upsampled image into a database or other repository of upsampled images 108, such that the higher-resolution upsampled image can be accessed and used in place of, and/or in addition to, the low resolution image. In other examples, the image upsampling system 100 can output the upsampled image via a message or notification sent to a user or other consumer who requested the upsampled image.

The image upsampling system 100 can repeat the process 500 shown in FIG. 5 for different low resolution images 104 in remote sensing data 106. For example, image upsampling system 100 can repeat process 500 for different low resolution images 104 received in a batch of remote sensing data 106, different remote sensing data 106 received over time, low resolution images 104 corresponding to different geographical areas identified in requests from users or other consumers, or other low resolution images 104. Accordingly, the upsampled images 108 generated from such low resolution images 104 via the process 500 shown in FIG. 5 can be used instead of, or in addition to, the low resolution images 104.

Figure 6:
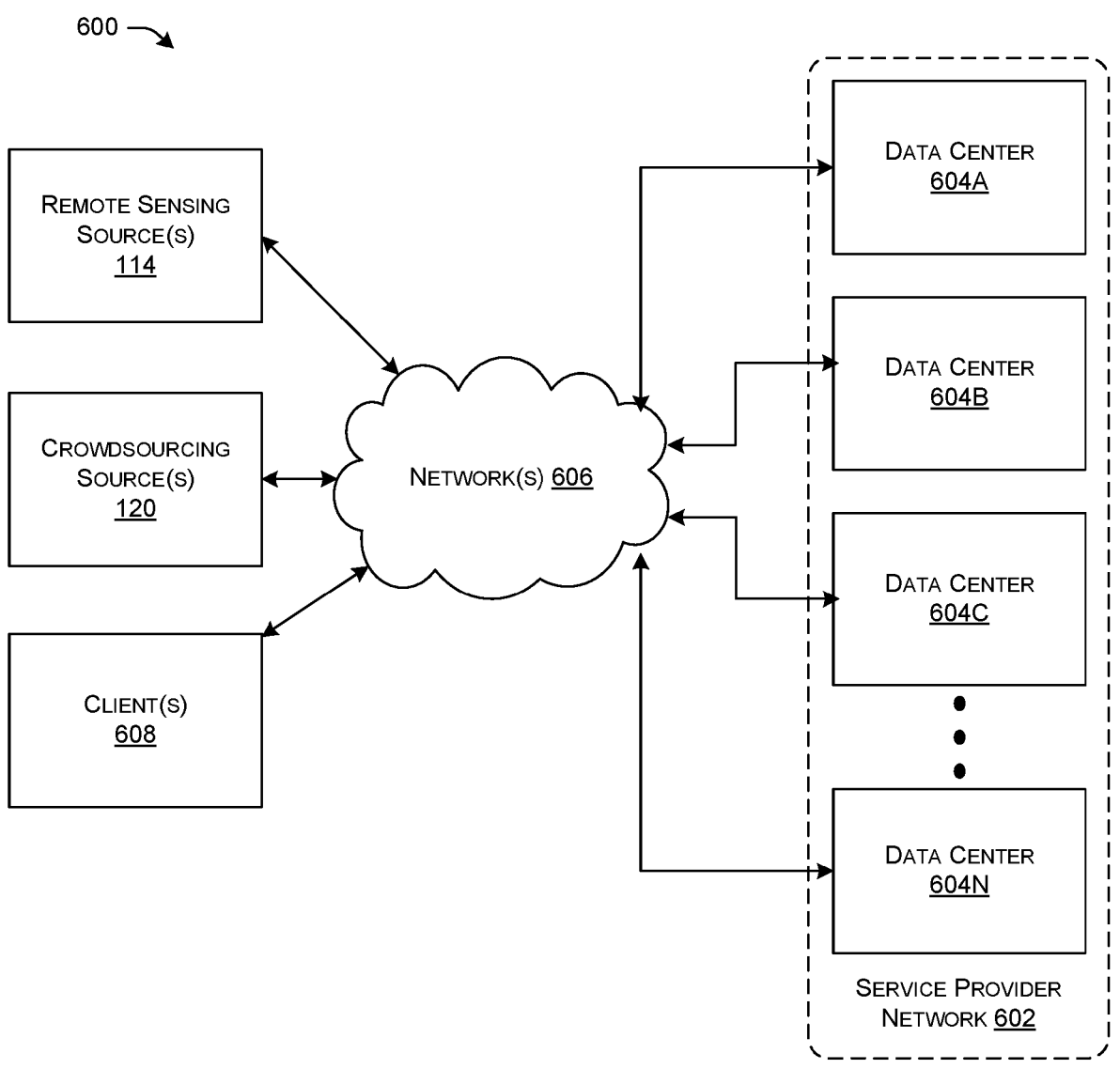
FIG. 6 is a system and network diagram that shows an illustrative operating environment for configurations disclosed herein.

FIG. 6 is a system and network diagram that shows an illustrative operating environment 600 for the configurations disclosed herein, which includes a service provider network 602 that can be configured to perform techniques disclosed herein. In some examples, the service provider network 602 can be an example of a cloud computing environment Elements of the service provider network 602 can execute various types of computing and network services, such as data storage and data processing, and/or can provide computing resources for various types of systems on a permanent or an as-needed basis. For example, among other types of functionality, the computing resources provided by the service provider network 602 may be utilized to implement various services described above such as, for example, services provided and/or used by the image upsampling system 100 and/or other elements described herein. Additionally, the operating environment can provide computing resources that include, without limitation, data storage resources, data processing resources, such as virtual machine (VM) instances, networking resources, data communication resources, network services, and other types of resources.

Each type of computing resource provided by the service provider network 602 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 602 can also be configured to provide other types of computing resources not mentioned specifically herein.

The computing resources provided by the service provider network 602 may be enabled in one embodiment by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 7.

The data centers 604 may be configured in different arrangements depending on the service provider network 602. For example, one or more data centers 604 may be included in, or otherwise make-up, an availability zone. Further, one or more availability zones may make-up or be included in a region. Thus, the service provider network 602 may comprise one or more availability zones, one or more regions, and so forth. The regions may be based on geographical areas, such as being located within a predetermined geographical perimeter.

Users and/or owners of the service provider network 602 may access the computing resources provided by the service provider network 602 over any wired and/or wireless network(s) 606, which can be a wide area communication network ("WAN"), such as the Internet, an intranet or an Internet service provider ("ISP") network or a combination of such networks. For example, and without limitation, computing device(s), e.g., computing devices associated with remote sensing sources 114, crowdsourcing sources 120, and/or clients 608 can be utilized to access the service provider network 602 by way of the network(s) 606. As an example, computing devices associated with remote sensing sources 114 can provide remote sensing data 106, via the network(s) 606, to one or more elements of the image upsampling system 100 that are executed at one or more of the data centers 604 of the service provider network 602. Similarly, computing devices associated with crowdsourcing sources 120 can provide crowdsourced data 112, via the network(s) 606, to one or more elements of the image upsampling system 100 that are executed at one or more of the data centers 604 of the service provider network 602. As another example, computing devices associated with clients 608, such as users, web services, and/or other elements that use and/or consume upsampled remote sensing data 138, can use the network(s) 606 to request and/or access upsampled remote sensing data 138 from one or more elements of the image upsampling system 100 that are executed at one or more of the data centers 604 of the service provider network 602. It should be appreciated that a local-area network ("LAN"), the Internet, or any other networking topology known in the art that connects the data centers 604 to remote customers and other users can be utilized. It should also be appreciated that combinations of such networks can also be utilized.

Each of the data centers 604 may include computing devices that include software, such as applications that receive and transmit data. The data centers 604 can also include databases, data stores, or other data repositories that store and/or provide data. For example, data centers 604 can store and/or execute one or more instances of the upsampling model 102, the remote sensing data repository 116, the crowdsourced data repository 122, the crowdsourced data pre-processor 126, the model training system 134, and/or other elements associated with the image upsampling system 100. For instance, one or more data centers 604 can execute the model training system 134 to train the upsampling model 102. In some examples, the trained upsampling model 102 can be executed at one or more of the data centers 604. In other examples, the trained upsampling model 102 can be deployed to execute via computing resources associated with one or more remote sensing sources 114 and/or one or more clients 608, and/or be deployed to execute via other computing resources. In some examples, the data centers 604 can also execute instances of elements associated with the remote sensing sources 114, the crowdsourcing sources 120, the clients 608, and/or other elements that interact with elements of the image upsampling system 100 at the same and/or different data centers 604 of the service provider network 602.

Figure 7:
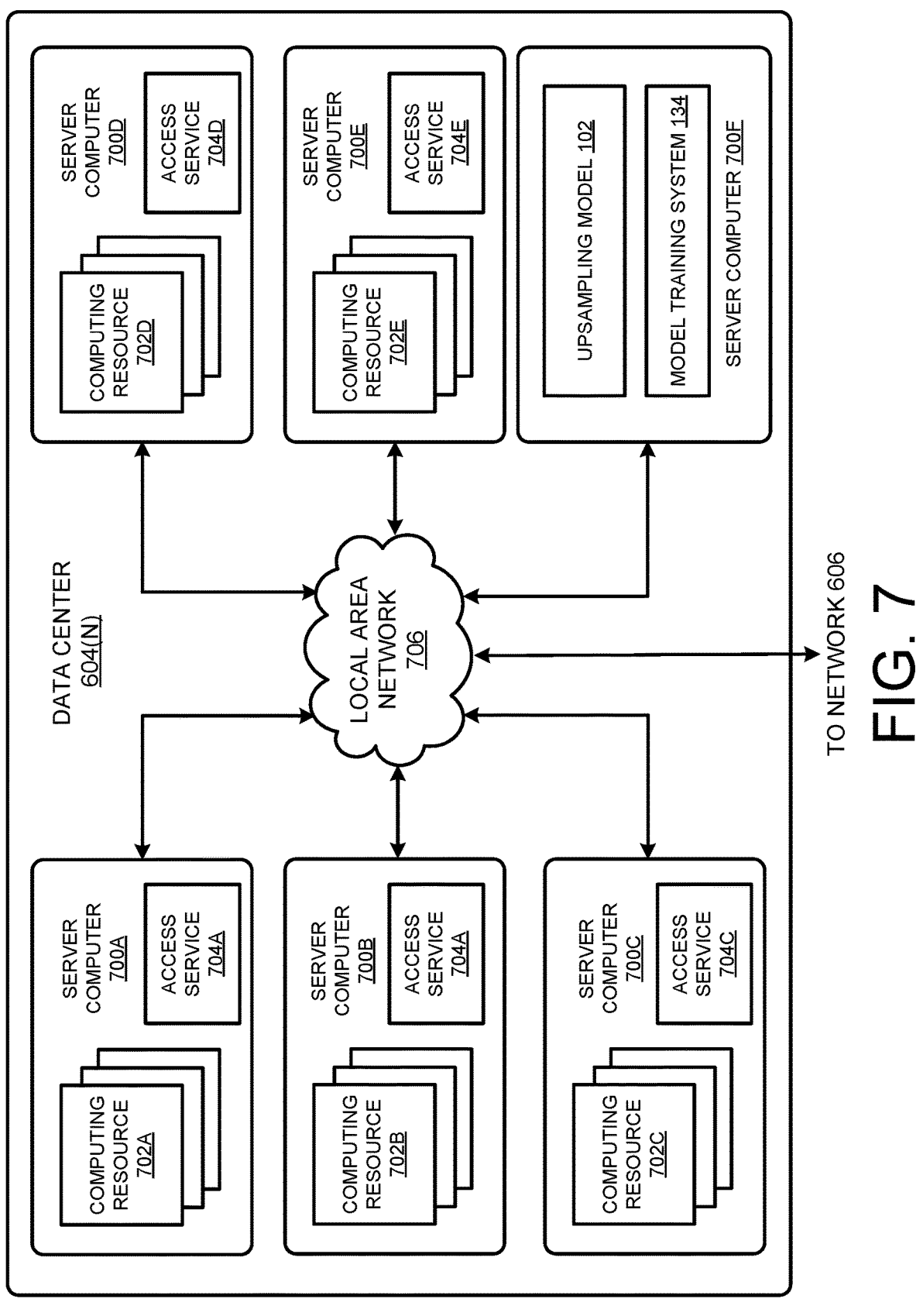
FIG. 7 is a computing system diagram that illustrates one configuration for a data center that can be utilized to implement one or more elements of the image upsampling system.

FIG. 7 is a computing system diagram that illustrates one configuration for a data center 604(N) that can be utilized to implement one or more elements of the image upsampling system 100 as described above with respect to FIGS. 1-6. The example data center 604(N) shown in FIG. 7 includes several server computers 700A-700E (collectively 700) for providing computing resources 702A-702E (collectively 702), respectively.

The server computers 700 can be standard tower, rack-mount, or blade server computers configured appropriately for providing the various computing resources (illustrated in FIG. 7 as the computing resources 702A-702E). The computing resources 702 can include, without limitation, analytics applications, data storage resources, data processing resources such as VM instances or hardware computing systems, database resources, networking resources, and others. Some of the servers 700 can also be configured to execute access services 704A-704E (collectively 704) capable of instantiating, providing and/or managing the computing resources 702, some of which are described in detail herein.

The data center 604(N) shown in FIG. 7 also includes a server computer 700F that can execute any or all of the software components described above. For example, and without limitation, the server computer 700F can be configured to execute the upsampling model 102 and/or the model training system 134 that trains the upsampling model 102. The server computer 700F can also be configured to execute other components and/or to store data for providing some or all of the functionality described herein. In this regard, it should be appreciated that components of the systems described herein can execute on many other physical or virtual servers in the data centers 604 in various configurations. For example, the upsampling model 102 and/or the model training system 134 may execute via different server computers 700 of the same data center 604 or different data centers 604.

In the example data center 604(N) shown in FIG. 7, an appropriate LAN 706 is also utilized to interconnect the server computers 700A-700F. The LAN 706 is also connected to the network 606 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 604(1)-(N), between each of the server computers 700A-700F in each data center 604, and, potentially, between computing resources 702 in each of the data centers 604. It should be appreciated that the configuration of the data center 604 described with reference to FIG. 7 is merely illustrative and that other implementations can be utilized.

Figure 8:
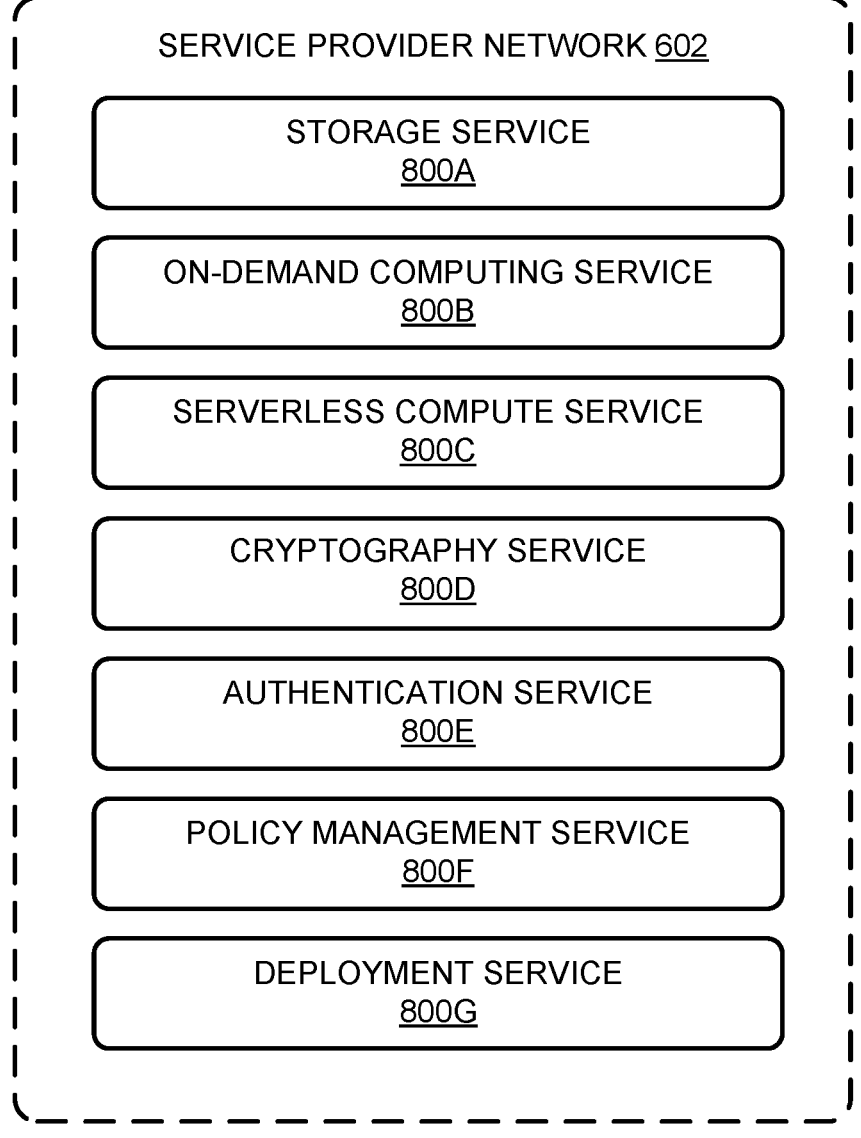
FIG. 8 is a system services diagram that shows aspects of several services that can be provided by and utilized within a service provider network.

FIG. 8 is a system services diagram that shows aspects of several services that can be provided by and utilized within the service provider network 602, which can be configured to implement the various technologies disclosed herein. The service provider network 602 can provide a variety of services to users including, but not limited to, a storage service 800A, an on-demand computing service 800B, a serverless compute service 800C, a cryptography service 800D, an authentication service 800E, a policy management service 800F, and a deployment service 800G. The service provider network 602 can also provide other types of computing services, some of which are described below.

It is also noted that not all configurations described include the services shown in FIG. 8 and that additional services can be provided in addition to, or as an alternative to, the services explicitly described herein. Each of the systems and services shown in FIG. 8 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other.

Additional details regarding some of the services shown in FIG. 8 will now be provided.

The storage service 800A can be a network-based storage service that stores data obtained from users of the service provider network 602 and/or from computing resources in the service provider network 602. The data stored by the storage service 800A can be obtained from remote sensing sources 114, crowdsourcing sources 120, clients 608, and/or other sources. The data stored by the storage service 800A may also include data associated with the upsampling model 102, the crowdsourced data pre-processor 126, the model training system 134, and/or other elements described herein. For example, the storage service 800A may store data associated with training of the upsampling model 102, such that one or more instances of the trained upsampling model 102 can be used to generate upsampled remote sensing data 138 from new remote sensing data 106.

The on-demand computing service 800B can be a collection of computing resources configured to instantiate VM instances and to provide other types of computing resources on demand. For example, a user of the service provider network 602 can interact with the on-demand computing service 800B (via appropriately configured and authenticated API calls, for example) to provision and operate VM instances that are instantiated on physical computing devices hosted and operated by the service provider network 602. The VM instances can be used for various purposes, such as to operate as servers supporting the network services described herein, a web site, to operate business applications or, generally, to serve as computing resources for a user. In some examples, one or more of the remote sensing sources 114, crowdsourcing sources 120, clients 608, and/or elements of the image upsampling system 100 can execute via computing resources provided by the on-demand computing service 800B.

Other applications for the VM instances can be to support database applications, electronic commerce applications, business applications and/or other applications. Although the on-demand computing service 800B is shown in FIG. 8, any other computer system or computer system service can be utilized in the service provider network 602 to implement the functionality disclosed herein, such as a computer system or computer system service that does not employ virtualization and instead provisions computing resources on dedicated or shared computers/servers and/or other physical devices.

The serverless compute service 800C is a network service that allows users to execute code (which might be referred to herein as a "function") without provisioning or managing server computers in the service provider network 802. Rather, the serverless compute service 800C can automatically run code in response to the occurrence of events. The code that is executed can be stored by the storage service 800A or in another network accessible location.

In this regard, it is to be appreciated that the term "serverless compute service" as used herein is not intended to infer that servers are not utilized to execute the program code, but rather that the serverless compute service 800C enables code to be executed without requiring a user to provision or manage server computers. The serverless compute service 800C executes program code only when needed, and only utilizes the resources necessary to execute the code. In some configurations, the user or entity requesting execution of the code might be charged only for the amount of time required for each execution of their program code.

The service provider network 602 can also include a cryptography service 800D. The cryptography service 800D can utilize storage services of the service provider network 602, such as the storage service 800A, to store encryption keys in encrypted form, whereby the keys can be usable to decrypt user keys accessible only to particular devices of the cryptography service 800D. The cryptography service 800D can also provide other types of functionality not specifically mentioned herein.

The service provider network 602, in various configurations, also includes an authentication service 800E and a policy management service 800F. The authentication service 800E, in one example, is a computer system (i.e., collection of computing resources) configured to perform operations involved in authentication of users or customers. For instance, one of the services shown in FIG. 8 can provide information from a user or customer to the authentication service 800E to receive information in return that indicates whether or not the requests submitted by the user or the customer are authentic.

The policy management service 800F, in one example, is a network service configured to manage policies on behalf of users or customers of the service provider network 602. The policy management service 800F can include an interface (e.g. API or GUI) that enables customers to submit requests related to the management of a policy, such as a security policy. Such requests can, for instance, be requests to add, delete, change, or otherwise modify policy for a customer, service, or system, or for other administrative actions, such as providing an inventory of existing policies and the like.

The service provider network 602 can additionally maintain other network services based, at least in part, on the needs of its customers. For instance, the service provider network 602 can maintain a deployment service 800G for deploying program code in some configurations. The deployment service 800G provides functionality for deploying program code, such as to virtual or physical hosts provided by the on-demand computing service 800B. Other services include, but are not limited to, database services, object-level archival data storage services, and services that manage, monitor, interact with, or support other services. The service provider network 602 can also be configured with other network services not specifically mentioned herein in other configurations.

Figure 9:
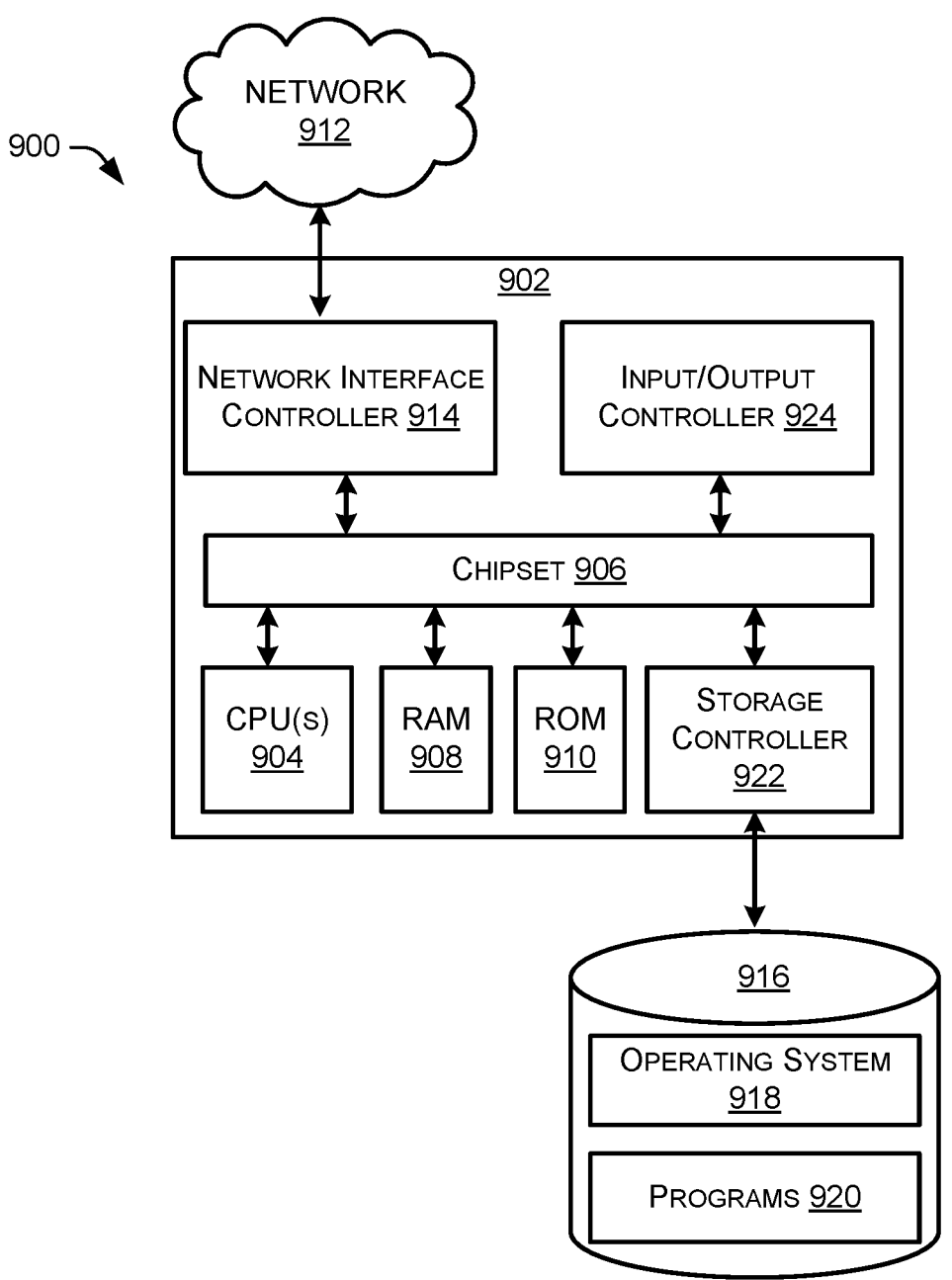
FIG. 9 shows an example computer architecture for a computer capable of executing program components for implementing functionality described herein.

FIG. 9 shows an example computer architecture for a computer 900 capable of executing program components for implementing functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. For instance, in some examples, the computer 900 may be associated with one or more elements of the image upsampling system 100, remote sensing sources 114, crowdsourcing sources 120, clients 608, and/or other elements.

The computer 900 includes a baseboard 902, or "motherboard," which may be one or more printed circuit boards to which a multitude of components and/or devices may be connected by way of a system bus and/or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 912. The chipset 906 can include functionality for providing network connectivity through a NIC 914, such as a gigabit Ethernet adapter. The NIC 914 is capable of connecting the computer 900 to other computing devices over the network 912. It should be appreciated that multiple NICs 914 can be present in the computer 900, connecting the computer to other types of networks and remote computer systems.

The computer 900 can be connected to a mass storage device 916 that provides non-volatile storage for the computer. The mass storage device 916 can store an operating system 918, programs 920, and data, which have been described in greater detail herein. The mass storage device 916 can be connected to the computer 900 through a storage controller 922 connected to the chipset 906. The mass storage device 916 can consist of one or more physical storage units. The storage controller 922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 916 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 916 is characterized as primary or secondary storage, and the like.

For example, the computer 900 can store information to the mass storage device 916 by issuing instructions through the storage controller 922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 916 by detecting the physical states or characteristics of one or more particular locations within the physical storage units.

In addition to the mass storage device 916 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 916 can store an operating system 918 utilized to control the operation of the computer 900. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 916 can store other system or application programs and data utilized by the computer 900.

In one configuration, the mass storage device 916 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above. The computer 900 can also include computer-readable storage media for performing any of the other computer-implemented operations described herein.

The computer 900 can also include one or more input/output controllers 924 for receiving and processing input from a number of input devices, such as a keyboard, a mouse, a touchpad, a touch screen, an electronic stylus, or other type of input device. Similarly, an input/output controller 924 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for using an upsampling model 102, trained on a training data set 136 that pairs low resolution images 104 in remote sensing data 106 and high resolution images 110 in crowdsourced data 112 based on location data, to generate upsampled images 108 from low resolution images 104 in remote sensing data 106 have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:

receiving, by an image upsampling system, first satellite images depicting first geographical areas from a top-down perspective;

receiving, by the image upsampling system, crowdsourced dashcam images captured by dashcams mounted on vehicles, wherein the crowdsourced dashcam images are determined to depict the first geographical areas based, at least in part, on one or more features identified in the crowdsourced dashcam images:

depict the first geographical areas from a front-facing perspective, and depict the first geographical areas at a higher resolution than the first satellite images;

converting, by the image upsampling system, the crowdsourced dashcam images into crowdsourced top-down images that depict the first geographical areas from the top-down perspective at the higher resolution, at least one crowdsourced top-down image of the crowdsourced top-down images including a combination of a first converted crowdsourced dashcam image and a second converted crowdsourced dashcam image with one or more overlapping regions, the one or more overlapping regions being prioritized for the combination based on a level of detail for the one or more overlapping regions in the first converted crowdsourced dashcam image and the second converted crowdsourced dashcam image;

generating, by the image upsampling system, a training data set that comprises pairs of the first satellite images and the crowdsourced top-down images that depict same areas within the first geographical areas;

training, by the image upsampling system, an upsampling model based on the training data, wherein:

the upsampling model is a machine learning model, and the upsampling model is trained to determine an upsampling approach that upsamples the first satellite images of the pairs into higher-resolution images that correspond with associated crowdsourced top-down images of the pairs;

receiving, by the image upsampling system, second satellite images depicting second geographical areas; and generating, by the image upsampling system, and using the upsampling approach associated with the upsampling model, upsampled images from the second satellite images that depict the second geographical areas at the higher resolution than the second satellite images.

2. The method of claim 1, further comprising determining, by the image upsampling system, that the crowdsourced dashcam images depict the first geographical areas by:

using visual odometry operations to identify a trajectory associated with successive dashcam images captured by one of the dashcams; and determining that the trajectory corresponds with a navigable travel route that corresponds to one of the first geographical areas.

3. The method of claim 1, further comprising:

combining, by the image upsampling system, multiple crowdsourced top-down images that overlap into a single crowdsourced top-down image that depicts a swath of a particular geographical area;

identifying, by the image upsampling system, a portion of a particular first satellite image that depicts the swath of the particular geographical area; and pairing, by the image upsampling system, the single crowdsourced top-down image and the portion of the particular first satellite image in the training data set.

4. The method of claim 1, wherein the training of the upsampling model comprises:

determining a downsampling approach comprising a first chain of image processing operations that degrade the crowdsourced top-down images of the pairs into degraded images that correspond with associated first satellite images of the pairs, and determining the upsampling approach by identifying a second chain of image processing operations that upsample the degraded images into the higher-resolution images that correspond with the crowdsourced top-down images.

5. A method comprising:

receiving, by an image upsampling system, first remote sensing data comprising:

first low resolution images depicting one or more first geographical areas; and first location data indicating one or more first locations of the one or more first geographical areas;

receiving, by the image upsampling system, and from one or more crowdsourcing sources, crowdsourced data comprising high resolution images determined to depict the one or more first geographical areas based, at least in part, on one or more identified features in the crowdsourced data, wherein the high resolution images in the crowdsourced data depict the one or more first geographical areas at a higher resolution than the first low resolution images in the first remote sensing data and the high resolution images in the crowdsourced data depict a different perspective than the first low resolution images;

converting two or more high resolution images in the crowdsourced data into a combined image having a common perspective as the first low resolution images, the combined image including one or more overlapping regions prioritized for the combination based on a level of detail in the two or more high resolution images;

determining, by the image upsampling system, an upsampling approach associated with an upsampling model that upsamples one or more portions of the first low resolution images, that depict same areas within the one or more first geographical areas as corresponding high resolution images, into higher-resolution images that substantially match the corresponding high resolution images;

receiving, by the image upsampling system, second remote sensing data comprising second low resolution images depicting one or more second geographical areas; and generating, by the image upsampling system, and using the upsampling approach associated with the upsampling model, upsampled images from the second low resolution images that depict the one or more second geographical areas at the higher resolution than the second low resolution images.

6. The method of claim 5, wherein the upsampling model is a machine learning model, and determining the upsampling approach comprises:

generating, by the image upsampling system, a training data set that comprises pairs of the first low resolution images and the high resolution images that depict the same areas within the one or more first geographical areas, based at least in part on the first location data and second location data indicating one or more second locations at which the high resolution images in the crowdsourced data were captured; and training, by the image upsampling system, and based at least on part on the training data set, the upsampling model to determine one or more image processing operations of the upsampling approach that upsample the one or more portions of the low resolution images of the pairs into the higher-resolution images that substantially match the high resolution images of the pairs.

7. The method of claim 6, wherein the training of the upsampling model comprises:

determining a downsampling approach comprising a first chain of one or more first image processing operations that degrade the high resolution images of the pairs into degraded images that correspond with associated low resolution images of the pairs, and determining the upsampling approach by identifying a second chain of one or more second image processing operations that upsample the degraded images into the higher-resolution images that substantially match the high resolution images.

8. The method of claim 7, further comprising:

generating, by the image upsampling system, an updated training data set that comprises additional pairs of low resolution images and the high resolution images based at least in part on at least one of additional remote sensing data or additional crowdsourced data; and re-training, by the image upsampling system, the upsampling model based at least in part on the updated training data set, wherein the re-training of the upsampling model based at least in part on the updated training data set adjusts at least one of:

the first chain of the one or more first image processing operations associated with the downsampling approach, or the second chain of the one or more second image processing operations associated with the upsampling approach.

9. The method of claim 5, wherein the first low resolution images and the second low resolution images are images captured by cameras of at least one of satellites, unmanned aerial vehicles, or other aerial vehicles or equipment.

10. The method of claim 5, wherein the high resolution images are images captured by at least one of cell phone cameras, drone cameras, or other cameras.

11. The method of claim 5, wherein the high resolution images are dashcam images captured by dashcams mounted on vehicles.

12. The method of claim 11, further comprising:

converting, by the image upsampling system, the dashcam images from a front-facing perspective into top-down images that depict the one or more first geographical areas from a top-down perspective at the higher resolution, wherein the first low resolution images depict the one or more first geographical areas from the top-down perspective, and wherein the image upsampling system determines the upsampling approach based at least in part on pairs of the first low resolution images and the top-down images, converted from the dashcam images, that depict the same areas.

13. The method of claim 11, further comprising deriving, by the image upsampling system, second location data, indicating one or more second locations at which the high resolution images were captured, by:

using visual odometry operations to identify a trajectory associated with successive ones of the dashcam images; and determining that the trajectory corresponds with a navigable travel route that corresponds to the one or more second locations.

14. The method of claim 5, further comprising deriving, by the image upsampling system, second location data, indicating one or more second locations at which the high resolution images were captured, by the one or more identified features depicted in the high resolution images that are indicative of the one or more second locations.

15. The method of claim 5, further comprising:

combining, by the image upsampling system, multiple overlapping images of the high resolution images into a single high resolution image that depicts a swath of a particular geographical area; and identifying, by the image upsampling system, a portion of a particular low resolution image, of the first low resolution images, that depicts the swath of the particular geographical area, wherein the image upsampling system determines the upsampling approach based at least in part on a pair of the single high resolution image and the portion of the particular low resolution image.

16. One or more non-transitory computer-readable media storing computer-executable instructions associated with an image upsampling system that, when executed by one or more processors, cause the one or more processors to perform operations comprising:

receiving first remote sensing data comprising:

first low resolution images depicting one or more first geographical areas; and first location data indicating one or more first locations of the one or more first geographical areas;

receiving, from one or more crowdsourcing sources, crowdsourced data comprising high resolution images determined to depict the one or more first geographical areas based, at least in part, on one or more identified features in the crowdsourced data, wherein the high resolution images in the crowdsourced data depict the one or more first geographical areas at a higher resolution than the first low resolution images in the first remote sensing data and the high resolution images in the crowdsource data depict a different perspective than the first low resolution images;

converting two or more high resolution images in the crowdsourced data into a combined image having a common perspective as the first low resolution images, the combined image including one or more overlapping regions prioritized for the combination based on a level of detail in the two or more high resolution images;

determining an upsampling approach, associated with an upsampling model, that upsamples one or more portions of the first low resolution images, that depict same areas within the one or more first geographical areas as corresponding high resolution images, into higher-resolution images that substantially match the corresponding high resolution images;

receiving second remote sensing data comprising second low resolution images depicting one or more second geographical areas; and generating, using the upsampling approach associated with the upsampling model, upsampled images from the second low resolution images that depict the one or more second geographical areas at the higher resolution than the second low resolution images.

17. The one or more non-transitory computer-readable media of claim 16, wherein the upsampling model is a machine learning model, and determining the upsampling approach comprises:

generating a training data set that comprises pairs of the first low resolution images and the high resolution images that depict the same areas within the one or more first geographical areas, based at least in part on the first location data and second location data indicating one or more second locations at which the high resolution images in the crowdsourced data were captured;

training, based at least on part on the training data set, the upsampling model to determine a downsampling approach comprising a first chain of image processing operations that degrade the high resolution images of the pairs into degraded images that correspond with associated low resolution images of the pairs; and training, based at least on part on the training data set, the upsampling model to determine the upsampling approach, wherein the upsampling approach comprises a second chain of image processing operations that upsample the degraded images into the higher-resolution images that substantially match the high resolution images.

18. The one or more non-transitory computer-readable media of claim 16, wherein the high resolution images are images captured by at least one of dashcams mounted on vehicles, cell phone cameras, drone cameras, or other cameras.

19. The one or more non-transitory computer-readable media of claim 16, wherein:

the first low resolution images depict the one or more first geographical areas from a top-down perspective, the high resolution images depict the one or more first geographical areas from a front-facing perspective, the operations further comprise converting the high resolution images from the front-facing perspective into top-down images that depict the one or more first geographical areas from the top-down perspective at the higher resolution, and the upsampling approach is determined based at least in part on pairs of the first low resolution images and the top-down images, converted from the high resolution images, that depict the same areas.

20. The one or more non-transitory computer-readable media of claim 16, wherein the operations further comprise:

combining multiple overlapping images of the high resolution images into a single high resolution image that depicts a swath of a particular geographical area; and identifying a portion of a particular low resolution image, of the first low resolution images, that depicts the swath of the particular geographical area; and wherein the upsampling approach is determined based at least in part on a pair of the single high resolution image and the portion of the particular low resolution image.

* * * * *